(12) United States Patent
Mizushima et al.

(10) Patent No.: US 8,351,108 B2
(45) Date of Patent: Jan. 8, 2013

(54) WAVELENGTH CONVERSION LASER AND IMAGE DISPLAY DEVICE

(75) Inventors: Tetsuro Mizushima, Hyogo (JP); Tatsuo Itoh, Osaka (JP); Kenji Nakayama, Osaka (JP); Koichi Kusukame, Osaka (JP); Tomoya Sugita, Nara (JP)

(73) Assignee: Panasonic Corporation, Osaka (JP)

(*) Notice: Subject to any disclaimer, the term of this patent is extended or adjusted under 35 U.S.C. 154(b) by 289 days.

(21) Appl. No.: 12/935,723

(22) PCT Filed: Jun. 9, 2010

(86) PCT No.: PCT/JP2010/003852
§ 371 (c)(1),
(2), (4) Date: Sep. 30, 2010

(87) PCT Pub. No.: WO2011/016170
PCT Pub. Date: Feb. 10, 2011

(65) Prior Publication Data
US 2011/0170173 A1    Jul. 14, 2011

(30) Foreign Application Priority Data

Aug. 3, 2009 (JP) .................. 2009-180297

(51) Int. Cl.
*G02F 1/37* (2006.01)
*H01S 3/10* (2006.01)
(52) U.S. Cl. ......................... 359/328; 372/22
(58) Field of Classification Search .......... 359/326–332; 372/21–22
See application file for complete search history.

(56) References Cited

U.S. PATENT DOCUMENTS

| 5,249,193 | A  | * | 9/1993 | Watanabe .............. 372/23 |
| 7,187,703 | B2 |   | 3/2007 | Kadoya |
| 7,542,491 | B2 |   | 6/2009 | Furuya et al. |
| 8,068,274 | B2 | * | 11/2011 | Mizushima et al. .......... 359/326 |
| 2005/0058174 | A1 | | 3/2005 | Kadoya |
| 2006/0045161 | A1 | | 3/2006 | Kadoya |
| 2007/0297481 | A1 | | 12/2007 | Adachi |
| 2008/0165812 | A1 | | 7/2008 | Furuya et al. |
| 2008/0316592 | A1 | | 12/2008 | Adachi |

(Continued)

FOREIGN PATENT DOCUMENTS

JP    2000-12929    1/2000

(Continued)

OTHER PUBLICATIONS

International Search Report issued Jul. 6, 2010 in International (PCT) Application No. PCT/JP2010/003852.

*Primary Examiner* — Daniel Petkovsek
(74) *Attorney, Agent, or Firm* — Wenderoth, Lind & Ponack, L.L.P.

(57) ABSTRACT

A wavelength conversion laser has: an exciting LD1, a solid state laser including a resonator, and a wavelength conversion element 7 disposed in the resonator. The solid state laser includes a first laser medium and a second laser medium as at least two types of laser media, and is configured to oscillate the solid state laser beams of the first emission wavelength and the second emission wavelength in the resonator as a result of the excitation light entering a region 3 configured from the first laser medium, thereafter entering a region 4 configured from the second laser medium, and subsequently entering a region 5 configured from the first laser medium. The wavelength conversion element 7 simultaneously generates a second harmonic and a sum frequency of the first emission wavelength and the second emission wavelength.

14 Claims, 12 Drawing Sheets

100

U.S. PATENT DOCUMENTS

2008/0316593 A1  12/2008  Adachi
2010/0309438 A1* 12/2010  Mizushima et al. ............ 353/31

FOREIGN PATENT DOCUMENTS

| | | |
|---|---|---|
| JP | 2000-114633 | 4/2000 |
| JP | 2002-111108 | 4/2002 |
| JP | 2005-93624 | 4/2005 |
| JP | 2006-66436 | 3/2006 |
| JP | 2008-4882 | 1/2008 |
| JP | 2008-193057 | 8/2008 |
| WO | 2009/069282 | 6/2009 |
| WO | 2009/130894 | 10/2009 |

* cited by examiner

200

300

400

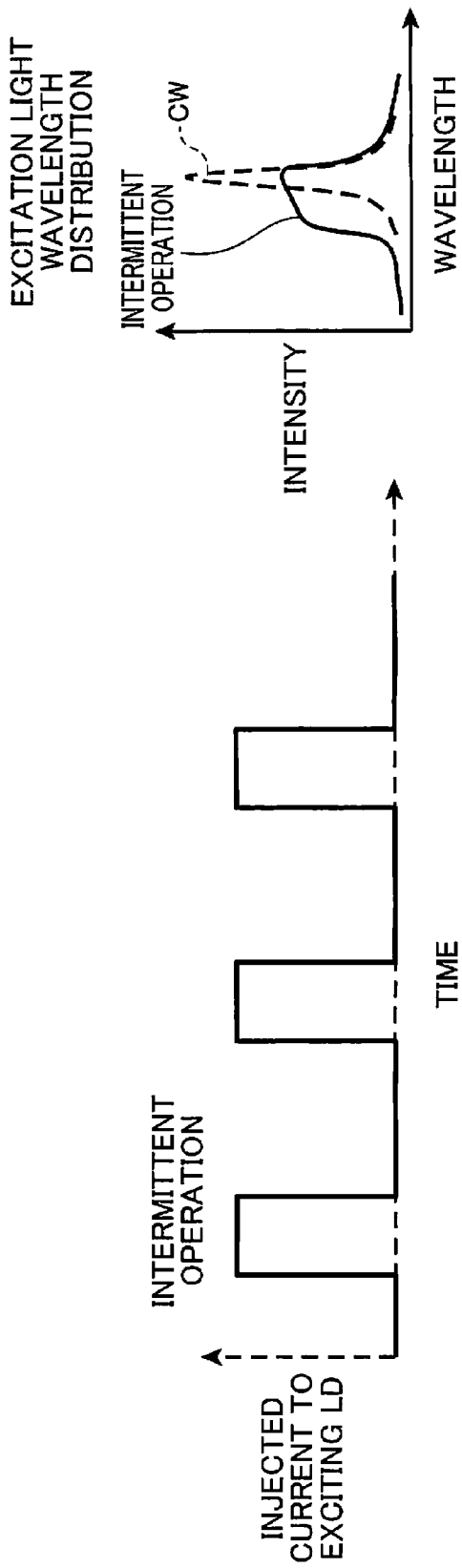

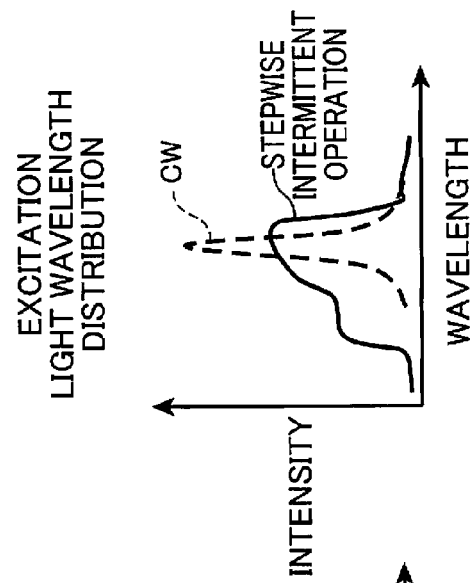
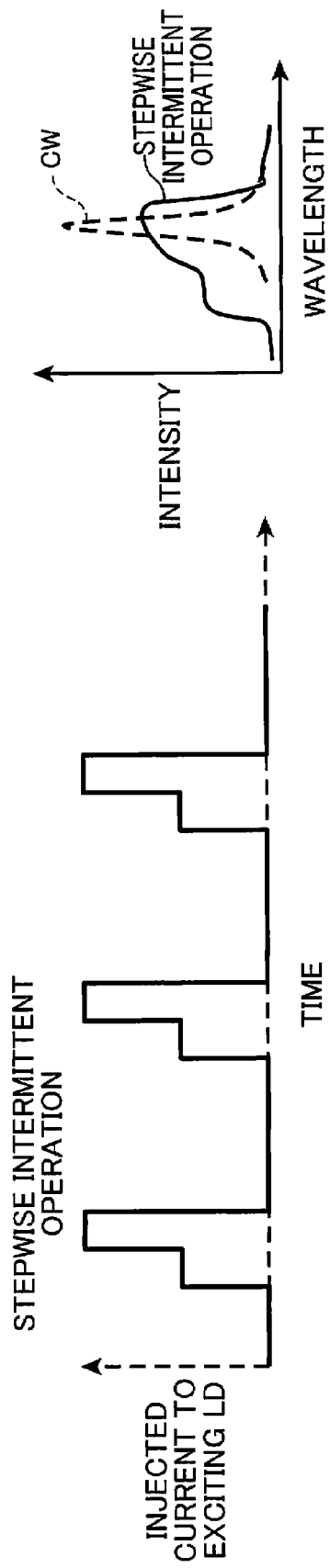

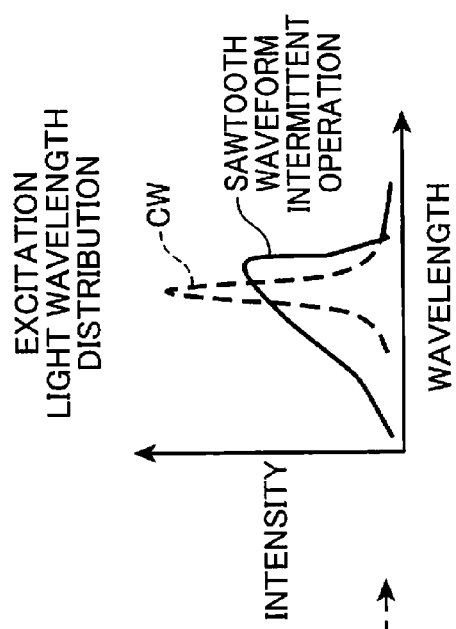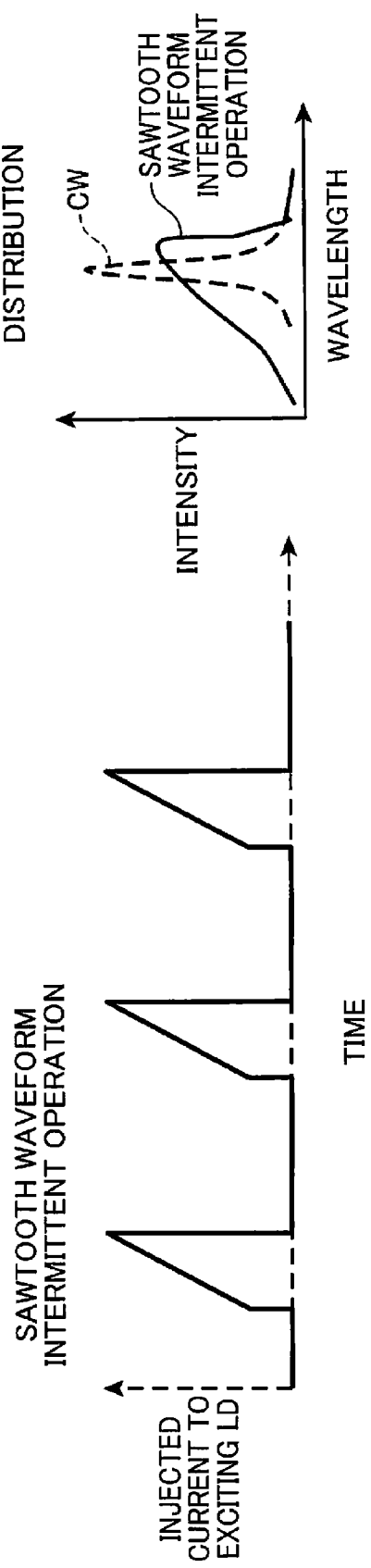

WAVELENGTH CONVERSION LASER AND IMAGE DISPLAY DEVICE

TECHNICAL FIELD

The present invention relates to an inner resonator-type wavelength conversion laser in which a wavelength conversion element is inserted into a solid state laser resonator, and to an image display device using the same.

BACKGROUND ART

A wavelength conversion laser for performing, based on the nonlinear optical phenomenon of a wavelength conversion element, wavelength conversion for converting the wavelength of a fundamental laser into converted waves such as a second harmonic (Second Harmonic Generation: SHG), a sum frequency (Sum Frequency Generation: SFG), a difference frequency (Difference Frequency Generation: DFG) and the like has been developed. Above all, since an inner resonator-type wavelength conversion laser in which a wavelength conversion element is inserted into a solid state laser resonator uses a resonator structure, it is characterized in being able to perform highly efficient wavelength conversion.

In addition, among the solid state lasers, a micro chip solid state laser using a laser medium of sub mm to several mm is particularly compact and able to obtain a W-class output, and various applications thereof are anticipated. Application of the combination of a micro chip solid state laser and an inner resonator-type wavelength conversion laser is being attempted in the wavelength range that cannot be directly oscillated with a semiconductor laser, and in ranges that are demanded of giant pulses or high frequencies.

Conventionally, proposals have been made for using a plurality of crystals as the solid laser medium in order to improve the characteristics of the solid state laser and the wavelength conversion. Patent Document 1 attempts to achieve the high output of laser by arranging a plurality of crystals with a different rare earth ion concentration but of the same compositional formula as the laser medium in ascending order of concentration. Moreover, Patent Document 2 proposes a laser comprising a plurality of laser media including a fluorescence spectral range in which at least a part thereof mutually overlaps in the resonator, wherein the fluorescence spectral width is enlarged to cover a broad wavelength range. In addition, Patent Document 3 proposes a configuration of using two types of solid laser media and three reflecting mirrors to configure a resonator of two wavelengths that share one reflecting mirror, and performing sum frequency mixing based on nonlinear optical crystals.

Nevertheless, although the conventional configurations proposed above are able to improve the respective characteristics, they do not give consideration to the fact that there will be substantial fluctuations in the output and characteristics when the laser is subject to a temperature change.

Furthermore, with respect to the application to fields of visual media, lighting and the like, the inner resonator-type wavelength conversion laser has problems in that the spectrum width is narrow and interference noise in the form of a splash known as speckle noise is generated. Specifically, with the inner resonator-type wavelength conversion laser, the achievement of a single mode and narrow band of the solid state laser were required in order to enable highly efficient wavelength conversion. However, it is necessary to broaden the spectrum width of the wavelength conversion laser beam in order to reduce the speckle noise. In addition, even in cases where a temperature change or the like occurs, a stable and broad spectrum width of the wavelength conversion laser beam is being sought.

Patent Document 1: Japanese Patent Application Laid-open No. 2005-93624
Patent Document 2: Japanese Patent Application Laid-open No. 2008-4882
Patent Document 3: Japanese Patent Application Laid-open No. 2006-66436

DISCLOSURE OF THE INVENTION

An object of this invention is to provide a wavelength conversion laser capable of stably outputting a low-coherent wavelength conversion laser beam with a broad spectrum width even in cases where a temperature change or the like occurs, and an image display device using the same.

The wavelength conversion laser device according to one aspect of the present invention has an excitation light source for outputting excitation light, a solid state laser including a resonator, and a wavelength conversion element disposed in the resonator, wherein the solid state laser includes a first laser medium and a second laser medium as at least two types of laser media, the first laser medium oscillates a solid state laser beam of a first emission wavelength and the second laser medium oscillates a solid state laser beam of a second emission wavelength, wherein said at least two types of laser media are excited by the excitation light that is output from the common excitation light source, wherein the solid state laser is configured to oscillate the solid state laser beams of the first emission wavelength and the second emission wavelength in the resonator as a result of the excitation light entering a region configured from the first laser medium, thereafter entering a region configured from the second laser medium, and subsequently entering a region configured from the first laser medium, and wherein the wavelength conversion element in the resonator converts the solid state laser beams of the first emission wavelength and the second emission wavelength into a second harmonic and a sum frequency of the first emission wavelength and the second emission wavelength, and simultaneously generates the second harmonic and the sum frequency.

With this wavelength conversion laser, even if the wavelength of the excitation light changes, the intensity ratio of the solid state laser beam of the first emission wavelength and the second emission wavelength can be maintained to be constant. Thus, even if a wavelength conversion element that simultaneously generates the second harmonic and the sum frequency of the first emission wavelength and the second emission wavelength is used, a broad spectrum width can be maintained without causing significant bias in the foregoing three wavelengths in the spectral distribution of the wavelength converted light. Consequently, it is possible to realize a wavelength conversion laser capable of stably outputting a low-coherent wavelength conversion laser beam with a broad spectrum width even if the wavelength of the excitation light changes due to the occurrence of a temperature change or the like.

BRIEF DESCRIPTION OF THE DRAWINGS

FIGS. 12A and 12B are explanatory diagrams showing an example of the waveform of the injected current to the exciting LD and the wavelength distribution of the excitation light according to the eighth embodiment of the present invention.

FIGS. 13A and 13B are explanatory diagrams showing another example of the waveform of the injected current to the exciting LD and the wavelength distribution of the excitation light according to the eighth embodiment of the present invention.

FIGS. 14A and 14B are explanatory diagrams showing yet another example of the waveform of the injected current to the exciting LD and the wavelength distribution of the excitation light according to the eighth embodiment of the present invention.

BEST MODE FOR CARRYING OUT THE INVENTION

First Embodiment

An embodiment of the present invention is now explained with reference to the attached drawings.

Figure 1:
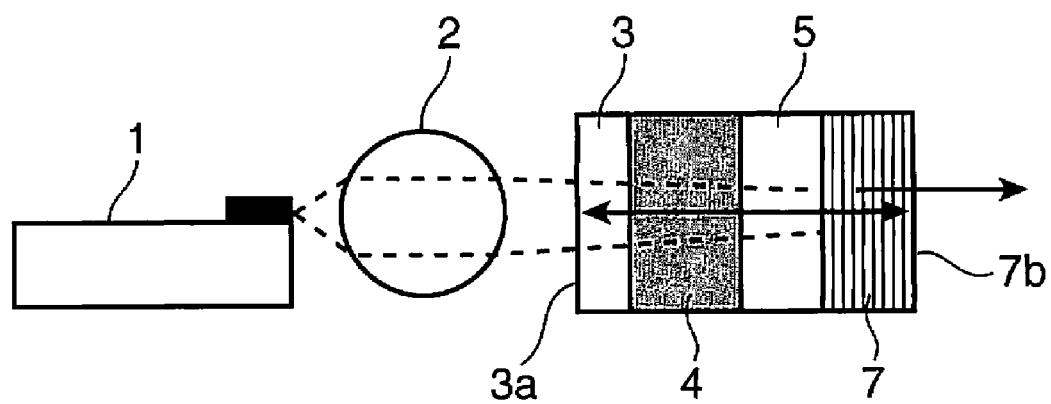
FIG. 1 is an explanatory diagram showing a schematic configuration of the wavelength conversion laser according to the first embodiment of the present invention.

FIG. 1 is a schematic configuration diagram of the wavelength conversion laser 100 according to the first embodiment of the present invention.

As shown in FIG. 1, the wavelength conversion laser 100 includes an exciting Laser Diode (LD) 1 (excitation light source), a light collection optical system 2, a laser medium 3 (first laser medium), a laser medium 4 (second laser medium), a laser medium 5 (first laser medium), and a wavelength conversion element 7.

The exciting LD1 as a semiconductor laser outputs excitation light for exciting the laser media 3, 4 and 5. The excitation light output from the exciting LD1 is collected by the light collection optical system 2 and overlapped with a solid state laser beam which resonates with the laser media 3, 4 and 5. The excitation light enters the laser medium 3, the laser medium 4, and the laser medium 5 in that order, and is absorbed by the respective laser media. The laser medium 3 and the laser medium 5 are the same Nd:YVO$_4$ with a different Nd concentration, and oscillate the solid state laser beams of the same emission wavelength IR1 (first emission wavelength). Meanwhile, the laser medium 4 is configured from Nd:GdVO$_4$, and oscillates a solid state laser beam of an emission wavelength IR2 (second emission wavelength) that is different from IR1.

The solid state laser of this embodiment is configured by a region (laser medium 4) configured from the second laser medium being disposed between two regions (laser media 3 and 5) configured from the first laser medium. The laser media 3, 4 and 5 are directly joined in that order. Moreover, the laser medium 5 and the wavelength conversion element 7 are directly joined. The solid state laser resonator is configured from an excitation light entrance-side plane 3a in the laser medium 3 and a wavelength converted light exit-side plane 7b in the wavelength conversion element 7. Thus, the configuration is such that the wavelength conversion element 7 is disposed in the solid state laser resonator. The excitation light entrance-side plane 3a of the foregoing solid state laser resonator is provided with an AR coat (antireflection coat) of the excitation light and an HR coat (high reflectance coat) of the solid state laser beam and the wavelength converted light, and allows transmission of through the excitation light while reflecting the solid state laser beam and the wavelength converted light. In addition, the wavelength converted light exit-side plane 7b of the foregoing solid state laser resonator is provided with an HR coat of the solid state laser beam and an AR coat of the wavelength converted light, and reflects the solid state laser beam while transmitting the wavelength converted light.

In the first embodiment, the laser medium 3 is configured from Nd:YVO$_4$ having a Nd concentration of 1% and a thickness of 0.2 mm. The laser medium 4 is configured from Nd:GdVO$_4$ having a Nd concentration of 1% and a thickness of 0.7 mm. The laser medium 5 is configured from Nd:YVO$_4$ having a Nd concentration of 3% and a thickness of 0.4 mm. The laser media 3 and 5 oscillate the solid state laser beam IR1 (emission wavelength IR1) having a center wavelength of 1064.1 nm. The laser medium 4 oscillates the solid state laser beam IR2 (emission wavelength IR2) having a center wavelength of 1062.8 nm.

MgO:LiNbO$_3$ (PPLN) having a polarization inversion periodical structure is used as the wavelength conversion element 7, and this is an extremely thin wavelength conversion element of 0.5 mm. Moreover, the polarization inversion period thereof is formed in 7 μm. The wavelength conversion element 7 of this embodiment is characterized in that it has an extremely broad phase matching tolerance. Thus, a single wavelength conversion element is able to generate a second harmonic SHG1 of the solid state laser beam IR1, a second harmonic SHG2 of the solid state laser beam IR2, and a sum frequency SFG1 of the solid state laser beams IR1 and IR2. Meanwhile, when introducing a plurality of wavelength conversion elements into the resonator, the loss in the resonator will increase, the efficiency will deteriorate, and the enlargement of size becomes a problem. In response to these problems, this embodiment is able to obtain a highly efficient, compact wavelength conversion laser by simultaneously performing wavelength conversion to a plurality of wavelengths with a single wavelength conversion element.

Figure 2A:
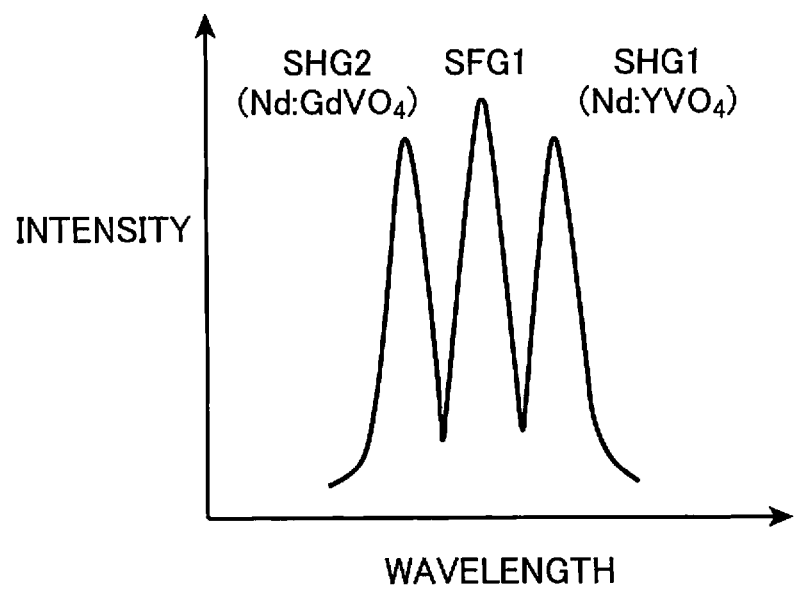
FIG. 2A is a graph showing the spectral distribution of the wavelength converted light according to the first embodiment of the present invention.

FIG. 2A shows the spectral distribution of the wavelength converted light that is output from the wavelength conversion laser 100. In FIG. 2A, the wavelength converted light SHG1 is the second harmonic (center wavelength of 532.1 nm) from the solid state laser beam IR1. Moreover, the wavelength converted light SHG2 is the second harmonic (center wavelength of 531.4 nm) from the solid state laser beam IR2. Further, the wavelength converted light SFG1 is the sum frequency (center wavelength of 531.8 nm) of the solid state laser beams IR1 and IR2.

Figure 2B:
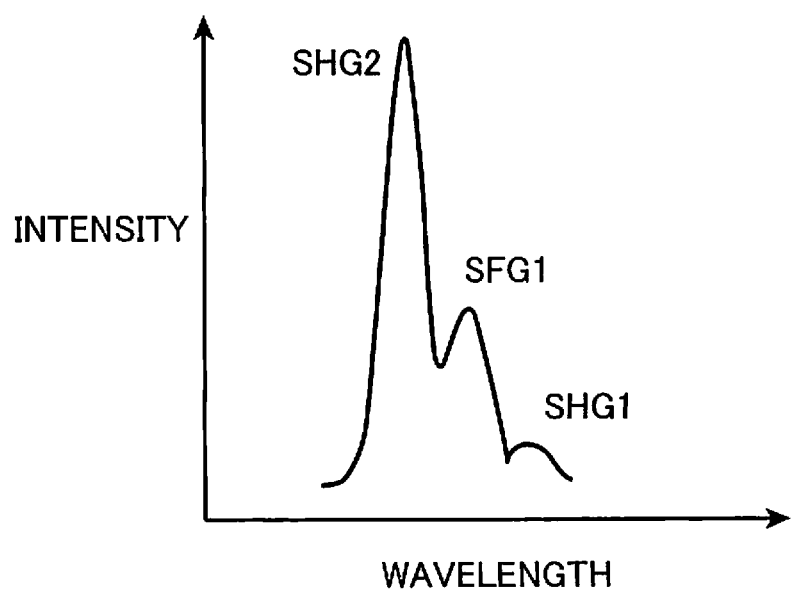
FIG. 2B is a graph showing a comparative example of the spectral distribution of the wavelength converted light according to the first embodiment of the present invention.

FIG. 2B shows the spectral distribution of the wavelength converted light that is output when the excitation light absorption of the laser medium 4 supposedly becomes extremely great relative to the excitation light absorption of the laser medium 3 and the laser medium 5 (this is a comparative example of the wavelength conversion laser 100 of this embodiment). Here, as a result of the solid state laser beam IR2 oscillating in the resonator becoming extremely great relative to the solid state laser beam IR1, bias will occur in the spectral distribution of the wavelength converted light to be output. With a biased spectral distribution as shown in FIG. 2B, SHG2 is preferentially output. Thus, in comparison to the case shown in FIG. 2A, the spectrum width of the wavelength converted light will become narrow, the coherency will increase, and interference noise (speckle noise) will appear.

This embodiment comprises a characteristic configuration that is able to avoid a significant bias occurring in the spectral distribution of the wavelength converted light and the increase in the interference noise as shown in FIG. 2B.

Specifically, the wavelength conversion laser 100 comprises a laser medium 3 and a laser medium 5 of the emission wavelength IR1, and a laser medium 4 of the emission wavelength IR2. These laser media 3, 4 and 5 are excited with the excitation light that is output from the same semiconductor laser. In this embodiment, the configuration is such that the excitation light that is collected with the light collection optical system 2 enters the laser medium 3, thereafter enters the laser medium 4, and subsequently enters the laser medium 5.

This embodiment uses, as described above, the laser media 3 and 5 of the emission wavelength IR1 and the laser medium 4 of the emission wavelength IR2. Thus, even if the excitation light wavelength changes, the ratio of the excitation light absorbed amount can be kept constant between the two types of laser media of different emission wavelengths. According to the foregoing configuration of the wavelength conversion laser 100, the intensity of the solid state laser beam of the emission wavelength IR1 and the intensity of the solid state laser beam of the solid state laser beam IR2 can be kept constant. Thus, even if the wavelength conversion element 7 that simultaneously generates SHG1, SHG2 and SFG1 is used, wavelength converted light can be output without causing significant bias in the foregoing three wavelengths in the spectral distribution of the wavelength converted light. In addition, with this embodiment, the excitation light that entered the solid state laser resonator is distributed and absorbed by a plurality of laser media (laser media 3 to 5). Thus, the heat generation points resulting from the absorption of the excitation light can be distributed to a plurality of locations. Since it is possible to prevent the deterioration in the wavelength conversion efficiency caused by the heat generation of the laser medium, a highly efficient, high output wavelength conversion laser can be realized.

Change in the absorption ratio when the excitation light wavelength changes is now explained in detail.

Figure 3:
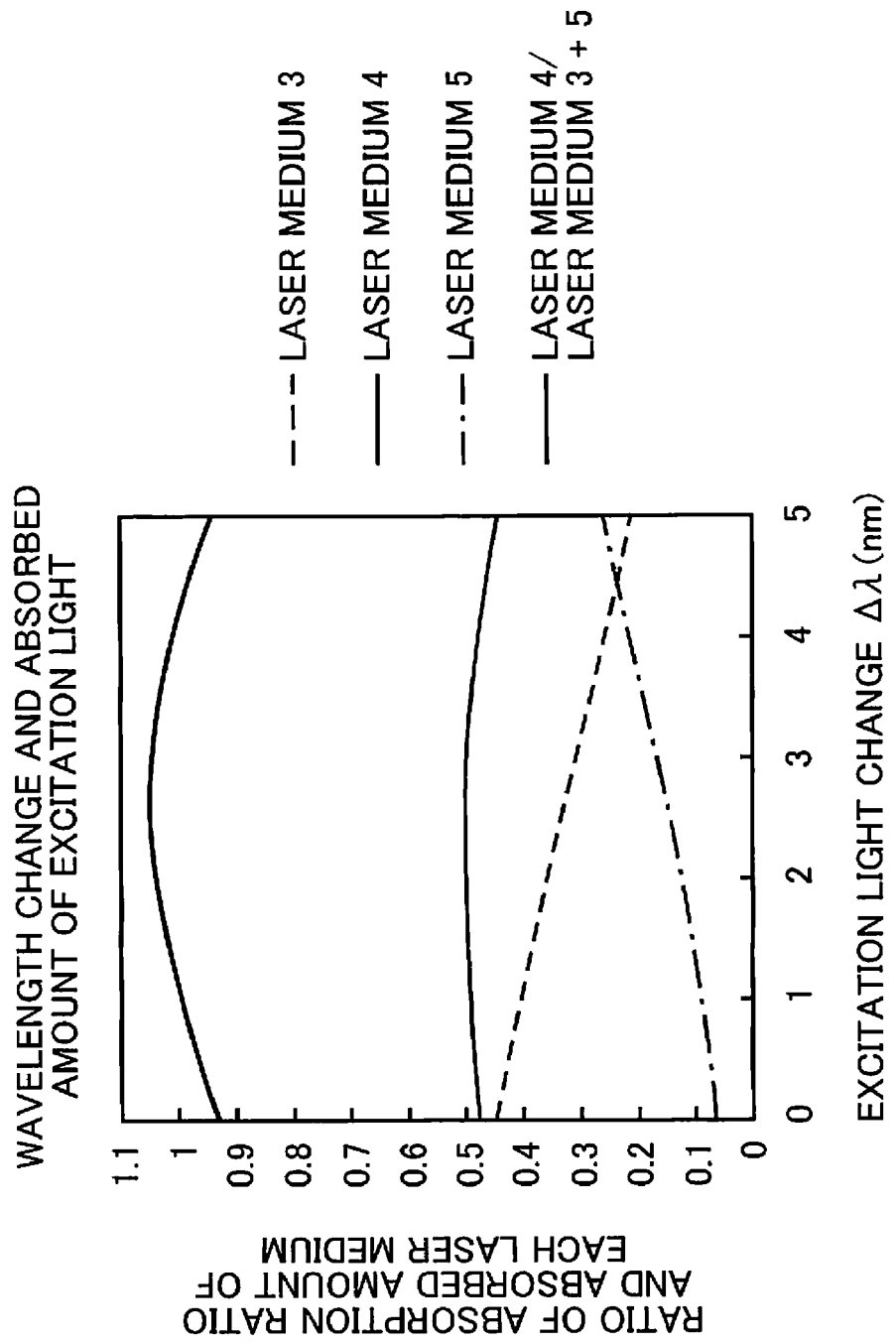
FIG. 3 is an explanatory diagram showing the calculation of the excitation light absorbed amount of the laser media according to the first embodiment of the present invention.

FIG. 3 shows the simulation results of the absorption ratio of the excitation light in the respective laser media 3 to 5 of the first embodiment. The exciting LD1 outputs excitation light of 808 nm under an environment of 25° C., but the excitation light wavelength will change if the temperature changes. The horizontal axis of FIG. 3 shows the wavelength shift amount when the excitation light wavelength from the exciting LD1 changes from 808 nm. The vertical axis shows the ratio of the absorption ratio and the absorbed amount of the respective laser media 3 to 5. Nd:YVO$_4$ and Nd:GdVO$_4$ with Nd as the active ions have an absorption peak wavelength at 808 nm, and the absorption coefficient becomes a peak value when the excitation light wavelength is 808 nm and the absorption coefficient decreases when the wavelength changes from 808 nm. The absorption ratio of the laser medium 3 of FIG. 3 is deteriorating based on the decrease in the absorption coefficient caused by the change in the wavelength from 808 nm. Specifically, when the wavelength changes from 808 nm, the absorption coefficient of light in the laser medium 3 and the laser medium 4 will decrease. Thus, the amount of excitation light that enters the laser medium 5 will increase and the absorption ratio of the excitation light in the laser medium 5 will increase. Meanwhile, with the laser medium 4, if the excitation light is subject to a wavelength change from 808 nm, the increase in the amount of light that passes through the laser medium 3 and the deterioration in the absorption coefficient of the laser medium 4 will occur simultaneously. Thus, the laser medium 4 is able to maintain an absorption ratio in the vicinity of 50% even if the wavelength of the excitation light changes. Here, the ratio of the combined absorption ratio of the laser medium 3 and the laser medium 5 of the emission wavelength IR1 and the absorption ratio of the laser medium 4 of the emission wavelength IR2 will be within the range of 0.9 to 1.1 even if the excitation light wavelength changes. As described above, according to the configuration of this embodiment, it is possible to keep constant the ratio of the absorbed amounts between the laser media of different emission wavelengths even when the excitation light wavelength changes. Thus, a broad spectrum width can be maintained without causing significant bias in the spectral distribution of the wavelength converted light to be output even if the excitation light wavelength changes. Unlike the configuration of the present invention, with a configuration that does not include the laser medium 5, the absorption ratio of the laser medium 3 of the emission wavelength IR1 and the laser medium 4 of the emission wavelength IR2 will become greater than 2 if the excitation light changes 6 nm due to a temperature change. Thus, a significant bias will occur in the spectrum width of the wavelength converted light to be output as with the comparative example shown in FIG. 2B.

The first embodiment is a preferred mode where the laser media 3 and 5 (Nd:YVO$_4$) of the emission wavelength IR1 are disposed before and after the laser medium 4 (Nd:GdVO$_4$) of the emission wavelength IR2, and the Nd ion concentration of the laser medium 5 is higher than the Nd ion concentration of the laser medium 3. Change in the absorption ratio of the laser medium is mainly caused by the absorption coefficient decreasing due to the wavelength change of the excitation light. Here, in order to maintain the total absorption ratio of the laser medium, it is necessary to extend the length of the laser medium or increase the active ion concentration.

Nevertheless, in order to avoid the problems caused by heat generation, it is not possible to ensure the amount of excitation light to enter the laser medium 4 by extending the length of the laser medium 3 to which the excitation light initially enters or increasing the active ion concentration.

Thus, in this embodiment, the active ion concentration of the laser medium 5 is made to be higher than the laser medium 3 in order to keep the total absorption ratio constant. To extend the length of the laser medium will lead to increased costs and enlargement in size. Thus, it is preferably to increase the active ion concentration of the laser medium 5 as in this embodiment.

Here, the excitation light that enters the laser medium 5 will be the remainder after being absorbed by the laser medium 3 and the laser medium 4 provided to the entrance side of the laser medium 5. Thus, the power of the excitation light that enters the laser medium 5 will be smaller than the power of the excitation light that enters the laser medium 3. Consequently, even if the active ion concentration of the laser medium 5 is set to be higher than the laser medium 3, the increase in temperature of the laser medium caused by the absorption of the excitation light can be kept down.

A preferred mode of this embodiment is to use Nd:YVO$_4$ as the laser media 3 and 5 of the emission wavelength IR1 and use Nd:GdVO$_4$ as the laser medium 4 of the emission wavelength IR2, and join the adjacent laser media among the foregoing laser media.

A vanadate system laser medium that uses Nd as the active ions has a large stimulated-emission cross-section, and oscillation is possible even with a short crystal length. Although a plurality of laser media are used in this embodiment, and YVO$_4$ and GdVO$_4$ are of the same crystal system, the refractive index and the coefficient of thermal expansion are approximately equal. Thus, by joining the laser media configured from the foregoing crystal systems, they can be treated as a single crystal.

In particular, as a result of directly joining the crystals of two types of laser media, the joint strength between the crystals is yielded and processing such as cutting can also be performed easily. Since a plurality of types of laser media are excited with the same semiconductor laser in this embodiment, a short laser medium length is required in order to maintain the collected state of the excitation light. Thus, if the laser media configured from Nd:YVO$_4$ and Nd:GdVO$_4$ are joined as with the foregoing configuration, crystal gaps can be eliminated and the respective crystal lengths can be shortened. Note that the term "join" as used in this specification refers to a state of being closely attached without the inclusion of an air layer. In this embodiment, Nd:YVO$_4$ with a longer emission wavelength than the laser medium 4 is used as the laser medium 3 to which the excitation light first enters. Specifically, a preferred mode of this embodiment is to use a laser medium with a longer emission wavelength on the entrance side of the excitation light of the laser medium to be joined.

As a result of the excitation light first entering a laser medium with a longer emission wavelength, the temperature of the laser medium with a longer emission wavelength can be increased. With the laser medium with an increased temperature, since the emission wavelength will shift to the long wavelength side, the difference in the emission wavelength will increase due to the temperature increase, and the spectrum width of the wavelength converted light to be output can be further broadened.

The peak of the absorption ratio of the laser medium 3 when the wavelength of the excitation light changes in this embodiment is 45%. This is a preferred mode of the peak of the absorption ratio of the excitation light of the laser medium to which the excitation light first enters being 10% or higher and 75% or less.

If the peak of the absorption ratio of the laser medium 3 is greater than 75%, it is not possible to sufficiently secure the amount of excitation light to enter the laser medium 4 in the vicinity of the peak of the absorption ratio, the ratio of the absorbed amounts between the laser media (laser medium 4/laser medium 3+5) will become 0.35 or less, and this will cause a biased spectral distribution. Moreover, if the peak of the absorption ratio of the laser medium 3 is smaller than 10%, it is not possible to maintain the absorption ratio of the laser medium 4 to be around 50% when the excitation light is subject to a wavelength change, and this will cause a biased spectral distribution. The peak of the absorption ratio of the excitation light of the laser medium to which the excitation light first enters is preferably 20% or higher and 67% or less. As a result of being within the foregoing range, the ratio of the absorbed amounts between the laser media can be kept to be in a range of 0.5 to 2, and low-coherent light without any biased spectral distribution can be obtained.

A wide stripe LD is used as the exciting LD1 of this embodiment, but a multi stripe LD or an LD with a wavelength lock mechanism may also be used. Moreover, a combination of a plurality of lenses may be used as the light collection optical system 2. In addition, the exciting LD1 and the laser medium 3 may be disposed in close proximity to omit the light collection optical system.

The end face of the solid state laser resonator of the first embodiment is configured from flat surfaces, but the configuration may also be such that a concave mirror is used as the resonator end face or a lens or other optical parts are inserted into the resonator.

In this embodiment, the excitation light wavelength changed due to a temperature change, but the excitation light wavelength also changes due to variation in the lots of the exciting LD or other reasons. Nevertheless, according to the foregoing configuration of this embodiment, it is possible to stably output a wavelength conversion laser beam with a broad spectrum width even if the excitation light wavelength changes due to various reasons.

Although this embodiment uses Nd:YVO$_4$ as the laser media 3 and 5 and Nd:GdVO$_4$ as the laser medium 4, the present invention is not limited thereto. Specifically, it will suffice so as long as the laser media 3 and 5, and the laser medium 4 are of different emission wavelengths, and a laser medium other than Nd:YVO$_4$ may be used as the laser media 3 and 5, and a laser medium other than Nd:GdVO$_4$ may be used as the laser medium 4. Note that the difference in the emission wavelength of the two laser media means that the center wavelengths to be oscillated by the two laser media will mutually differ. Although the difference between the emission wavelength IR1 and the emission wavelength IR2 will vary depending on the laser medium that is used, it is preferable if such difference can be increased since the spectrum width of the obtained wavelength conversion laser beam can be further broadened. For example, if the difference between the emission wavelength IR1 and the emission wavelength IR2 is made to be 1 nm or more, it is possible to realize a favorable image display or lighting with low interference noise (speckle noise) in the application to fields of visual media and lighting.

Second Embodiment

Figure 4:
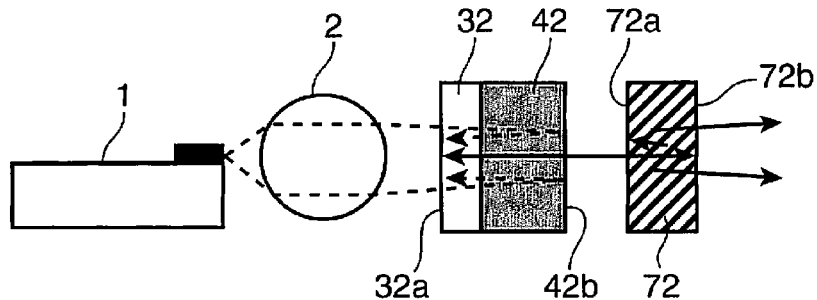
FIG. 4 is an explanatory diagram showing a schematic configuration of the wavelength conversion laser according to the second embodiment of the present invention.

The wavelength conversion laser 200 according to the second embodiment of the present invention is now explained with reference to FIG. 4. FIG. 4 shows a schematic configuration of the wavelength conversion laser 200. Note that, in FIG. 4, the same reference numeral is given to the same configuration as the foregoing first embodiment, and the detailed explanation thereof is omitted.

The wavelength conversion laser 200 includes two laser media; namely, a laser medium 32 (first laser medium) and a laser medium 42 (second laser medium). The laser medium 32 is configured from Nd:YVO$_4$ having a Nd concentration of 1% and a thickness of 0.3 mm, and the laser medium 42 is configured from Nd:GdVO$_4$ having a Nd concentration of 1% and a thickness of 0.7 mm. The solid state laser beam exit-side end face 42b of the laser medium 42 is provided with an AR coat of the solid state laser beam and an HR coat of the excitation light, and reflects through the excitation light while transmitting the solid state laser beam. The excitation light that is output from the exciting LD1 enters the laser medium 32 which oscillates the emission wavelength IR1, thereafter enters the laser medium 42 of the emission wavelength IR2, and subsequently enters the laser medium 32 once again after being reflected off the end face 42b.

The solid state laser resonator of the wavelength conversion laser 200 is configured from an end face 32a of the laser medium 32 and an end face 72b of the wavelength conversion element 72. The excitation light entrance-side end face 32a of the laser medium 32 is provided with an AR coat of the excitation light and an HR coat of the solid state laser beam, and allows transmission of the excitation light while reflecting the solid state laser beam. In addition, the wavelength converted light exit-side end face 72b of the wavelength conversion element 72 is provided with an HR coat of the solid state laser beam and an AR coat of the wavelength converted light, and the end face 72b reflects the solid state laser beam while transmitting and outputting wavelength converted light a and wavelength converted light b.

MgO:LiNbO$_3$ (PPLN) having a polarization inversion periodical structure is used as the wavelength conversion element 72, and this is an extremely thin wavelength conversion element of 0.7 mm. Moreover, the polarization inversion period thereof is formed in 6.8 μm, and the polarization inversion periodical structure is inclined 14 degrees relative to the optical axis of the solid state laser resonator in this embodiment. The end face 72a on the exciting LD1 side of the wavelength conversion element 72 is provided with an AR coat of the solid state laser beam and an HR coat of the wavelength converted light, and the end face 72a allows transmission of the solid state laser beam while reflecting the wavelength converted light. The wavelength conversion element 72 generates a second harmonic SHG1 of the solid state laser beam IR1, a second harmonic SHG2 of the solid state laser beam IR2, and a sum frequency SFG1 of the solid state laser beams IR1 and IR2.

Here, the wavelength converted light a is generated from the solid state laser beam advancing rightward in FIG. 4, and the wavelength converted light b is generated from the solid state laser beam advancing leftward. Specifically, as a result of the polarization inversion periodical structure of the wavelength conversion element 72 being inclined relative to the optical axis of the solid state laser resonator, the wavelength converted light a and the wavelength converted light b are output at an inclination. With the wavelength conversion laser 200, the wavelength converted light a and the wavelength converted light b are respectively output from the optical axis of the solid state laser resonator at an inclination of +0.5 deg and −0.5 deg. The wavelength converted light b is reflected off the end face 72a, thereafter output from the end face 72b, and output without entering the laser medium 32 and the laser medium 42. Since the wavelength converted light a and the wavelength converted light b are output at an inclination in opposite directions (the wavelength converted light a is output at an inclination of +θ relative to the optical axis of the solid state laser resonator, and the wavelength converted light b is output at an inclination of −θ relative to the optical axis), they are output as two beams that are inclined from the optical axis of the solid state laser resonator.

The wavelength conversion laser 200 is configured such that the excitation light re-enters the laser medium 32 of the emission wavelength IR1 based on the reflecting surface 42b of the excitation light. Specifically, the excitation light enters the laser medium 32 of the emission wavelength IR1, thereafter enters the laser medium 42 of the emission wavelength IR2, and subsequently re-enters the laser medium 32 of the emission wavelength IR1 as a result of being reflected off the reflecting surface 42b. Consequently, as with the operation and effect of the first embodiment, the ratio of the absorbed amounts of the laser medium 32 of the emission wavelength IR1 and the laser medium 42 of the emission wavelength IR2 will not bias significantly even if the wavelength of the excitation light changes, and it is possible to stably output wavelength converted light with a broad spectrum.

The laser medium 32 and the laser medium 42 are integrated by being directly joined together. Moreover, the laser medium 42 and the wavelength conversion element 72 are retained with a spacer so that the solid state laser resonator will not collapse. Note that the laser medium 42 and the wavelength conversion element 72 may be formed integrally by applying an HR coat of the excitation light, an AR coat of the solid state laser beam and an HR coat of the wavelength converted light at the interface thereof.

A preferred mode is as follows; namely, the wavelength conversion laser 200 has an HR coat of the excitation light on the wavelength conversion element-side end face 42b of the laser medium 42 of the emission wavelength IR2, the wavelength conversion element 72 has a polarization inversion periodical structure which is inclined relative to the optical axis of the solid state laser resonator and an end face 72a for reflecting the wavelength converted light that was generated with the wavelength conversion element 72, and the wavelength converted light is output as two beams without entering the laser media 32 and 42.

Specifically, since the wavelength conversion laser 200 has a high reflectance coat of the excitation light on the wavelength conversion element-side end face 42b of the laser medium 42 that is located farthest from the exciting LD1, it is able to cause the excitation light that is required in the present invention to foremost pass through the laser medium of the emission wavelength IR1, subsequently pass through the laser medium of the emission wavelength IR2, and thereafter once again enter the laser medium of the emission wavelength IR1 by using only the two laser media 32 and 42.

Moreover, as a result of reflecting the wavelength converted light b off the end face 72a between the laser medium 42 and the wavelength conversion element 72, the wavelength converted light b is prevented from passing through the laser medium 32 and the laser medium 42. When the wavelength converted light enters the laser medium 32 and the laser medium 42, a part of the wavelength converted light is absorbed and causes the deterioration in the output of the wavelength converted light and the heat generation of the laser medium. It is possible to prevent this and increase the output efficiency by reflecting the wavelength converted light off the end face 72a between the laser medium 42 and the wavelength conversion element 72.

Although the foregoing explained illustrated a case of reflecting the wavelength converted light that was generated with the wavelength conversion element 72 off the laser mediaide end face 72a of the wavelength conversion element 72, the present invention is not limited thereto, and it will suffice so as long as the configuration is able to include an interface for reflecting the wavelength converted light in the solid state laser resonator to prevent the wavelength converted light from entering the laser media 32 and 42. For example, the wavelength converted light that was generated with the wavelength conversion element 72 may be reflected off the wavelength conversion element 72-side end face 42b of the laser medium 42. Otherwise, a mirror member may be provided between the foregoing end face 42b and end face 72a for reflecting the wavelength converted light that was generated with the wavelength conversion element 72.

Meanwhile, if the wavelength converted light that was reflected off the end face 72a between the laser medium 42 and the wavelength conversion element 72 coincides with the optical axis of the solid state laser resonator, output fluctuation may occur due to the phase of the wavelength converted light. Specifically, if the propagation directions of the wavelength converted light a and the wavelength converted light b overlap, interference will occur between the two and thereby cause output fluctuation. In order to avoid this output fluctuation, with the wavelength conversion laser 200, the polarization inversion periodical structure is inclined from the optical axis of the solid state laser resonator so that the generated wavelength converted light a and the wavelength converted light b will be inclined, one by +θ and the other by −θ, relative to the optical axis of the solid state laser resonator. Accordingly, by separating and outputting the wavelength converted lights as the two beams of the wavelength converted light a and the wavelength converted light b, it is possible to avoid the interference between the two and thereby prevent output fluctuation.

As described above, based on the configuration where a high reflectance coat of the excitation light is formed on the wavelength conversion element-side end face 42b of the laser medium 42, the excitation light enters the laser medium 32 of the emission wavelength IR1, thereafter enters the laser medium 42 of the emission wavelength IR2, and subsequently re-enters the laser medium 32 of the emission wavelength IR1 upon being reflected off the reflecting surface 42b, it is possible to stably output wavelength converted light with a broad spectrum width. Thus, the wavelength converted light is not easily influenced by interference. In addition, as described above, based on the configuration where the polarization inversion periodical structure of the wavelength conversion element 72 is inclined from the optical axis of the solid state laser resonator, an interface for reflecting the wavelength converted light that was generated with the wavelength conversion element 72 is included in the solid state laser resonator, and the wavelength converted light is output as two beams (wavelength converted light a and wavelength converted light b) without entering the laser media 32 and 42, the wavelength converted light is hardly influenced by interference. As described above, the wavelength conversion laser 200 of this embodiment is able to stably output wavelength converted light that is free from output fluctuation caused by interference.

As described above, with this embodiment, as a result of using the high reflectance coat of the excitation light and the wavelength converted light formed between the laser medium and the wavelength conversion element and the inclination of the foregoing polarization inversion periodical structure, it is possible to reduce the number of laser media, increase the output efficiency of the wavelength converted light, and stably output wavelength converted light that is free from output fluctuation.

Third Embodiment

Figure 5:
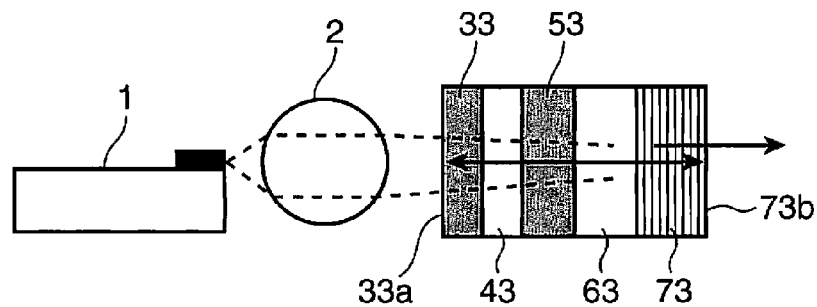
FIG. 5 is an explanatory diagram showing a schematic configuration of the wavelength conversion laser according to the third embodiment of the present invention.

The wavelength conversion laser 300 according to the third embodiment of the present invention is now explained with reference to FIG. 5. FIG. 5 shows a schematic configuration of the wavelength conversion laser 300. Note that, in FIG. 5, the same reference numeral is given to the same configuration as the foregoing embodiments, and the detailed explanation thereof is omitted.

The wavelength conversion laser 300 includes four laser media; namely, a laser medium 33 (first laser medium), a laser medium 43 (second laser medium), a laser medium 53 (first laser medium), and a laser medium 63 (second laser medium). The laser medium 33 is configured from Nd:GdVO$_4$ crystals having a Nd concentration of 0.5% and a thickness of 0.4 mm, and the laser medium 43 is configured from Nd:YVO$_4$ crystals having a Nd concentration of 3% and a thickness of 0.25 mm. Moreover, the laser medium 53 is configured from Nd:GdVO$_4$ crystals having a Nd concentration of 3% and a thickness of 0.65 mm, and the laser medium 63 is configured from Nd:YVO$_4$ crystals having a Nd concentration of 3% and a thickness of 0.9 mm. The laser medium 33 and the laser medium 53 oscillate the solid state laser beam of the emission wavelength IR2 as the first emission wavelength. Meanwhile, the laser medium 43 and the laser medium 63 oscillate the solid state laser beam of the emission wavelength IR1 as the second emission wavelength. The excitation light that was output from the exciting LD1 enters the laser medium 33 of the emission wavelength IR2, thereafter enters the laser medium 43 of the emission wavelength IR1, subsequently enters the laser medium 53 of the emission wavelength IR2, and finally enters the laser medium 63 of the emission wavelength IR1.

The laser medium 33, the laser medium 43, the laser medium 53 and the laser medium 63 are directly joined. The wavelength conversion element 73 is configured from LiTiO$_3$ having a polarization inversion periodical structure with a thickness of 1 mm. The wavelength conversion element 73 is able to simultaneously generate the respective second harmonics SHG1, SHG2 and their sum frequency SFG1 of the solid state laser beams of the emission wavelengths IR1, IR2. The laser medium 63 and the wavelength conversion element 73 are directly joined. The excitation light entrance-side end face 33a of the laser medium 33 is provided with an AR coat of the excitation light, an HR coat of the solid state laser beam, and an HR coat of the wavelength converted light. Moreover, the wavelength converted light exit-side end face 73b of the wavelength conversion element 73 is provided with an HR coat of the solid state laser beam and an AR coat of the wavelength converted light, and the end face 73b is the output plane of the wavelength converted light. The solid state laser resonator of the wavelength conversion laser 200 is configured from the end face 33a of the laser medium 33 and the end face 73b of the wavelength conversion element 73.

A preferred mode of the wavelength conversion laser 300 is such that the excitation light that was output from the semiconductor laser alternately enters two types of laser media two or more times. Even if the wavelength of the excitation light changes and the absorption coefficients of the laser media significantly change, the absorption ratio of the excitation light of the two types of laser media can be kept constant. It is thereby possible to output wavelength converted light with a broad spectrum width in an extremely broad temperature range.

Although the example of FIG. 5 showed a configuration of causing the excitation light that was output from the semiconductor laser to alternately enter the two types of laser media twice, the configuration may also be such that the excitation light alternately enters the two types of laser media three or more times.

Fourth Embodiment

Figure 6:
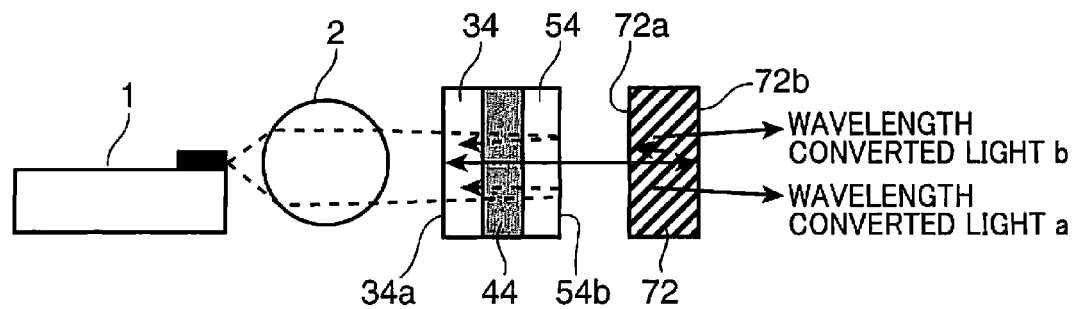
FIG. 6 is an explanatory diagram showing a schematic configuration of the wavelength conversion laser according to the fourth embodiment of the present invention.

The wavelength conversion laser 400 according to the fourth embodiment of the present invention is now explained with reference to FIG. 6. FIG. 6 shows a schematic configuration of the wavelength conversion laser 400. Note that, in FIG. 6, the same reference numeral is given to the same configuration as the foregoing embodiments, and the detailed explanation thereof is omitted.

The wavelength conversion laser 400 includes three laser media; namely, a laser medium 34 (first laser medium), a laser medium 44 (second laser medium), and a laser medium 54 (first laser medium). The wavelength conversion element-side end face 54b of the laser medium 54 is provided with an HR coat of the excitation light and an AR coat of the solid state laser beam, and reflects the excitation light while transmitting the solid state laser beam. The laser medium 34 is configured from Nd:YVO$_4$ containing Nd concentration of 1% and having a thickness of 0.2 mm, and the laser medium 44 is configured from Nd:GdVO$_4$ containing Nd concentration of 1% and having a thickness of 0.7 mm. Moreover, the laser medium 54 is configured from Nd:YVO$_4$ containing Nd concentration of 3% and having a thickness of 0.2 mm. These three laser media 34, 44 and 54 are directly joined. The exciting LD1-side end face 34a of the laser medium 34 is provided with an AR coat of the excitation light and an HR coat of the solid state laser beam, and allows transmission of the excitation light while reflecting the solid state laser beam. As with the second embodiment, MgO:LiNbO$_3$ (PPLN) having a polarization inversion periodical structure that is inclined relative to the optical axis of the solid state laser resonator is used as the wavelength conversion element 72. The laser medium 54-side end face 72a of the wavelength conversion element 72 is provided with an HR coat of the wavelength converted light and an AR coat of the solid state laser beam, and reflects the wavelength converted light while transmitting the solid state laser beam. The solid state laser resonator of the wavelength conversion laser 400 is configured from the end face 34a of the laser medium 34 and the end face 72b of the wavelength conversion element 72.

The excitation light that was output from the exciting LD1 enters the laser medium 34 of the emission wavelength IR1, and thereafter enters the laser medium 44 of the emission wavelength IR2. Subsequently, the excitation light enters the laser medium 54 of the emission wavelength IR1, thereafter enters the laser medium 44 of the emission wavelength IR2 once again upon being reflected off the end face 54b, and finally enters the laser medium 34 of the emission wavelength IR1.

Specifically, a preferred embodiment of the wavelength conversion laser 400 is for the excitation light that was output from the semiconductor laser (exciting LD1) to alternately enter two types of laser media two or more times. According to the configuration of this embodiment, even if the wavelength of the excitation light changes and the absorption coefficients of the laser media significantly change, the absorption ratio of the excitation light of the two types of laser media can be kept constant. It is thereby possible to output wavelength converted light with a broad spectrum width in an extremely broad temperature range.

Although the example of FIG. 6 showed a configuration of causing the excitation light that was output from the semiconductor laser to alternately enter the two types of laser media twice, the configuration may also be such that the excitation light alternately enters the two types of laser media three or more times.

A preferred mode is as follows; namely, the wavelength conversion laser 400 has an HR coat of the excitation light on the wavelength conversion element-side end face 54b of the laser medium 54 of the emission wavelength IR1, the wavelength conversion element 72 has a polarization inversion periodical structure which is inclined relative to the optical axis of the solid state laser resonator and an end face 72a for reflecting the wavelength converted light that was generated with the wavelength conversion element 72, and the wavelength converted light is output as two beams without entering the laser media 34, 44 and 54.

Specifically, with the wavelength conversion laser 400, since the laser medium 54 that is located farthest from the exciting LD1 has the high reflectance coat of the excitation light, it is configured to enable the excitation light to alternately enter a plurality of types of laser media 34, 44 and 54 based on the re-entry of the excitation light into the laser media 44 and 34 which are located closer to the exciting LD1 than the laser medium 54.

Moreover, as a result of reflecting the wavelength converted light b off the end face 72a between the laser medium 54 and the wavelength conversion element 72, the wavelength converted light b is prevented from passing through the laser media 34, 44 and 54. In other words, when the wavelength converted light enters the laser media, a part of the wavelength converted light is absorbed and causes the deterioration in the output of the wavelength converted light and the heat generation of the laser medium. This embodiment is configured to reflect the wavelength converted light off the end face between the laser medium 54 and the wavelength conversion element 72. Since it is thereby possible to prevent a part of the wavelength converted light from being absorbed by the laser media, the conversion efficiency and the output power of the wavelength converted light can be improved.

Although the foregoing explained illustrated a case of reflecting the wavelength converted light that was generated with the wavelength conversion element 72 off the laser mediaide end face 72a of the wavelength conversion element 72, the present invention is not limited thereto, and it will suffice so as long as the configuration is able to include an interface for reflecting the wavelength converted light in the solid state laser resonator to prevent the wavelength converted light from entering the laser media 34, 44 and 54. For example, the wavelength converted light that was generated with the wavelength conversion element 72 may be reflected off the wavelength conversion element 72-side end face 54b of the laser medium 54. Otherwise, a mirror member may be provided between the foregoing end face 54b and end face 72a for reflecting the wavelength converted light that was generated with the wavelength conversion element 72.

Meanwhile, if the wavelength converted light that was reflected off the end face 72a between the laser medium 54 and the wavelength conversion element 72 coincides with the optical axis of the solid state laser resonator, output fluctuation may occur due to the phase state between the wavelength converted lights. Specifically, if the propagation directions of the wavelength converted light a and the wavelength converted light b overlap, interference will occur between the two and thereby cause output fluctuation. In order to avoid this output fluctuation, with the wavelength conversion laser 400, the polarization inversion periodical structure is inclined from the optical axis of the solid state laser resonator so that the generated wavelength converted light a and the wavelength converted light b will be inclined, one by +θ and the other by −θ, relative to the optical axis of the solid state laser resonator. Accordingly, by separating and outputting the wavelength converted lights as the two beams of the wavelength converted light a and the wavelength converted light b, it is possible to avoid the interference between the two and thereby prevent output fluctuation.

As described above, based on the configuration where a high reflectance coat of the excitation light is formed on the wavelength conversion element-side end face 54b of the laser medium 54, and the excitation light that was output from the exciting LD1 alternately enters two types of laser media two or more times, it is possible to stably output wavelength converted light with a broad spectrum width. Thus, the wavelength converted light is not easily influenced by interference. In addition, as described above, based on the configuration where the polarization inversion periodical structure of the wavelength conversion element 72 is inclined from the optical axis of the solid state laser resonator, an interface for reflecting the wavelength converted light that was generated with the wavelength conversion element 72 is included in the solid state laser resonator, and the wavelength converted light is output as two beams (wavelength converted light a and wavelength converted light b) without entering the laser media 34, 44 and 54, the wavelength converted light is hardly influenced by interference. As described above, the wavelength conversion laser 400 of this embodiment is able to stably output wavelength converted light that is free from output fluctuation caused by interference.

As described above, with this embodiment, as a result of using the high reflectance coat of the excitation light and the wavelength converted light formed between the laser medium and the wavelength conversion element and the inclination of the foregoing polarization inversion periodical structure, it is possible to reduce the number of laser media, increase the output efficiency of the wavelength converted light, and stably output wavelength converted light that is free from output fluctuation.

Fifth Embodiment

Figure 7:
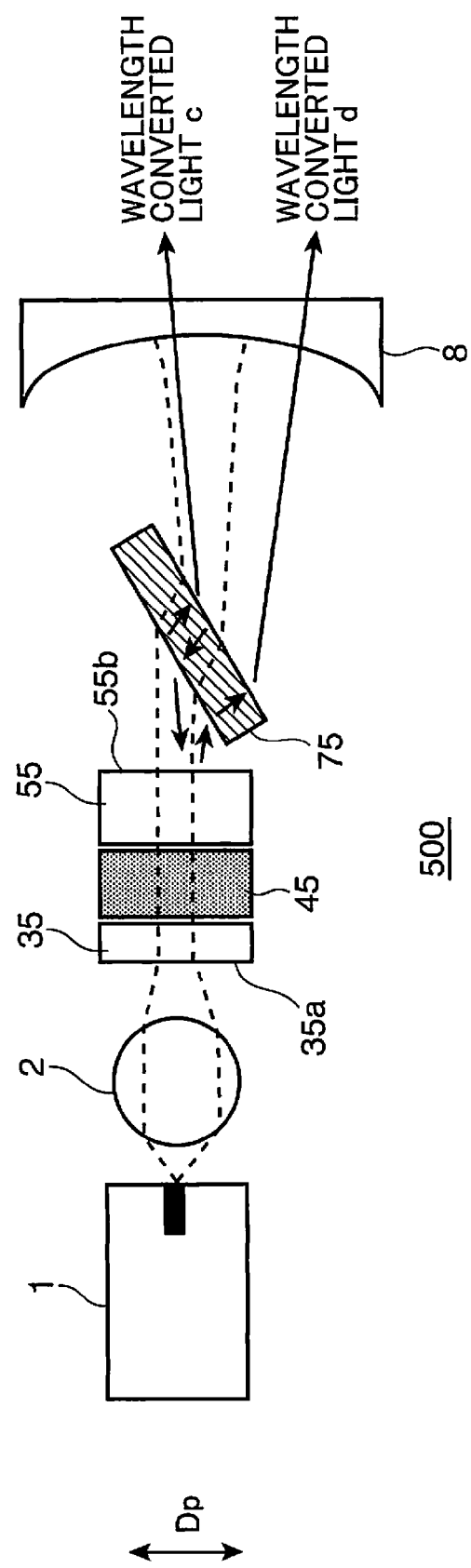
FIG. 7 is an explanatory diagram showing a schematic configuration of the wavelength conversion laser according to the fifth embodiment of the present invention.

The wavelength conversion laser 500 according to the fifth embodiment of the present invention is now explained with reference to FIG. 7. FIG. 7 shows a schematic configuration of the wavelength conversion laser 500. Note that, in FIG. 7, the same reference numeral is given to the same configuration as the foregoing embodiments, and the detailed explanation thereof is omitted.

The wavelength conversion laser 500 includes an exciting LD1, a light collection optical system 2, laser media 35, 45 and 55 disposed in that order from the side of the light collection optical system 2, a wavelength conversion element 75 disposed at a position where the solid state laser beam that was output from the laser medium 55 will enter, and a concave mirror 8 disposed at a position where the solid state laser beam that passed through the wavelength conversion element 75 will enter.

With the wavelength conversion laser 500, the excitation light, the solid state laser beam, and the wavelength converted light are oscillated with the linear polarized light in the vertical axis direction of the plane of paper. Note that in the first to fourth embodiments, a-cut Nd:YVO$_4$ and Nd:GdVO$_4$ were used as the laser media, and oscillation was performed with the polarization in the perpendicular direction of the plane of paper. The wavelength conversion laser 500 differs from the other embodiments in that the laser medium materials of the same composition are disposed so that the optical axes will be of different directions.

The laser medium 35 (first laser medium) is a-cut Nd:YVO$_4$ containing 1% of Nd and having a thickness of 0.2 mm. The laser medium 45 (second laser medium) is c-cut Nd:YVO$_4$ containing 3% of Nd and having a thickness of 0.7 mm. The laser medium 55 (first laser medium) is a-cut Nd:YVO$_4$ containing 3% of Nd and having a thickness of 0.4 mm, and has the same crystal axis as the laser medium 35. With a laser medium of a tetragonal vanadate system, the emission wavelength will differ depending on the optical axis direction of the crystals. With Nd:YVO$_4$, a center wavelength of 1064.1 nm is oscillated in the c axis direction, and a center wavelength of 1066.5 nm is oscillated in the a axis direction. With the laser medium 35 and the laser medium 55 as the a axis cuts, oscillation is preferentially performed in the c axis direction, and the wavelength IR1 (center wavelength of 1064.1 nm) as the first emission wavelength is oscillated. Meanwhile, the laser medium 45 as the c axis cut oscillates the wavelength IR3 (center wavelength of 1066.5 nm) in the a axis direction as the second emission wavelength. As described above, in this embodiment, the configuration is such that the axes of the tetragonal laser media 35, 45 and 55c are disposed in two types of directions; namely, a perpendicular direction and a parallel direction, relative to the optical axis of the resonator to realize different emission wavelengths.

MgO:LiNbO$_3$ (PPLN) having a polarization inversion periodical structure is used as the wavelength conversion element 75, and the end face thereof is ground to achieve a Brewster's angle relative to the optical axis of the solid state laser resonator. As a result of disposing the wavelength conversion element 75 at a Brewster's angle relative to the optical axis of the solid state laser resonator, the polarization direction Dp of the solid state laser beam to be oscillated by the laser medium 45 as the c axis cut is fixed in the vertical axis direction of the plane of paper of FIG. 7. Specifically, since the polarization direction of the solid state laser beam that is oscillated by the c axis cut laser medium 45 is not constant, such polarization direction is fixed by using the foregoing Brewster's angle. The wavelength conversion element 75 has an extremely thin thickness of 0.6 mm for passing the solid state laser beam therethrough, and has an extremely broad phase matching tolerance. The emission wavelength IR1 and the emission wavelength IR3 are linear polarized light of the same direction as a result of using the Brewster's angle. Thus, the wavelength conversion element 75 is able to simultaneously generate a second harmonic SHG1 of the solid state laser beam IR1, a second harmonic SHG3 of the solid state laser beam IR3, and a sum frequency SFG3 of the solid state laser beams IR1 and IR3.

The exciting LD1-side end face 35a of the laser medium 35 is provided with an AR coat of the excitation light and an HR coat of the solid state laser beam, and the end face 35a allows transmission of the excitation light while reflecting the solid state laser beam. The concave mirror 8 is provided with an HR coat of the solid state laser beam and an AR coat of the wavelength converted light, and the concave mirror 8 reflects the solid state laser beam while transmitting the wavelength converted light. The solid state laser resonator of the wavelength conversion laser 500 is configured from the foregoing concave mirror 8 and the end face 35a of the laser medium 35. The respective end faces between the adjacent laser media 35, 45 and 55 are provided with an AR coat of the excitation light and the solid state laser beam, and the excitation light and the solid state laser beam are able to pass through the respective end faces.

Moreover, the wavelength conversion element 75-side end face 55b of the laser medium 55 is provided with an AR coat of the solid state laser beam and an HR coat of the wavelength converted light, and the end face 55b allows transmission of the solid state laser beam while reflecting the wavelength converted light. Since the wavelength converted light d generated with the wavelength conversion element 75 is reflected off the end face 55b of the laser medium 55, it is output without passing through the laser media 35, 45 and 55. In addition, the wavelength converted light c that was generated from the solid state laser beam passing through the wavelength conversion element 75 in the rightward direction and the wavelength converted light d that was generated from the solid state laser beam passing through in the leftward direction are output as two beams.

The wavelength conversion laser 500 includes a laser medium of the emission wavelength IR1 and a laser medium of the emission wavelength IR3, and these two types of laser media are excited with the excitation light that is output from the same semiconductor laser. The excitation light enters the laser medium 35 of the emission wavelength IR1, thereafter enters the laser medium 45 of the emission wavelength IR3, and subsequently enters the laser medium 55 of the emission wavelength IR1. As a result of adopting this configuration, it is possible to keep constant the ratio of the absorbed amounts between the excitation light of the emission wavelength IR1 and the excitation light of the emission wavelength IR3 even when the excitation light wavelength changes. Thus, a broad spectrum width of the wavelength converted light to be output can be maintained.

As described above, a preferred mode of the wavelength conversion laser 500 is to dispose the same laser medium materials so that the optical axes are of different directions. According to the configuration of this embodiment, since the same laser medium material can be used, it is possible to reduce costs while enabling the oscillation of a plurality of wavelengths.

A preferred mode of the wavelength conversion laser according to this embodiment is as follows; namely, the emission wavelengths are made to be different by disposing the c axes of the tetragonal laser media to be different in two types of directions of a perpendicular direction and a parallel direction relative to an optical axis of the resonator, and the solid state laser beams of different emission wavelengths are oscillated in the resonator as linear polarized light of the same direction by disposing the wavelength conversion element at a Brewster's angle relative to an optical axis of the solid state laser resonator to simultaneously generate a second harmonic and a sum frequency.

As described above, wavelength conversion of a plurality of wavelengths is simultaneously performed by oscillating the linear polarized light of the same direction by using the Brewster's angle while realizing the oscillation of different wavelengths by using the anisotropy of the crystals to obtain wavelength converted light with a broad spectrum width. This kind of wavelength converted light with a broad spectrum width is free from interference noise can be suitably used broadly in the fields of visual media and lighting.

Moreover, a preferred mode of the wavelength conversion laser 500 is as follows; namely, the wavelength conversion element 75 is disposed at a Brewster's angle, the wavelength converted light to be output is displaced from the optical axis of the solid state laser resonator, a wavelength converted light reflecting surface 55b is provided between the laser medium and the wavelength conversion element, and the wavelength converted light is output without entering the laser media. When the wavelength converted light d that is generated from the solid state laser beam facing leftward in FIG. 7 enters a laser medium, a part thereof is absorbed and attenuated, but the configuration of this embodiment is able to prevent the above, and increase the output efficiency of the wavelength converted light. Moreover, the wavelength converted light d is subject to output fluctuation when it coincides with the optical axis of the solid state laser resonator, but the output fluctuation can be eliminated by displacing the wavelength converted light from the optical axis of the resonator.

With this embodiment described above, the wavelength conversion element 75 is disposed at a Brewster's angle in order to lock the polarization direction. Nevertheless, the present invention is not limited to the foregoing configuration so as long as a polarizer or the like which is able to inflict a loss on one of the polarized lights is used.

Although this embodiment illustrated a case of using a laser medium of a vanadate system, the present invention is not limited thereto, and a laser medium other than a vanadate system so as long as it is a tetragonal laser medium.

Sixth Embodiment

Figure 8:
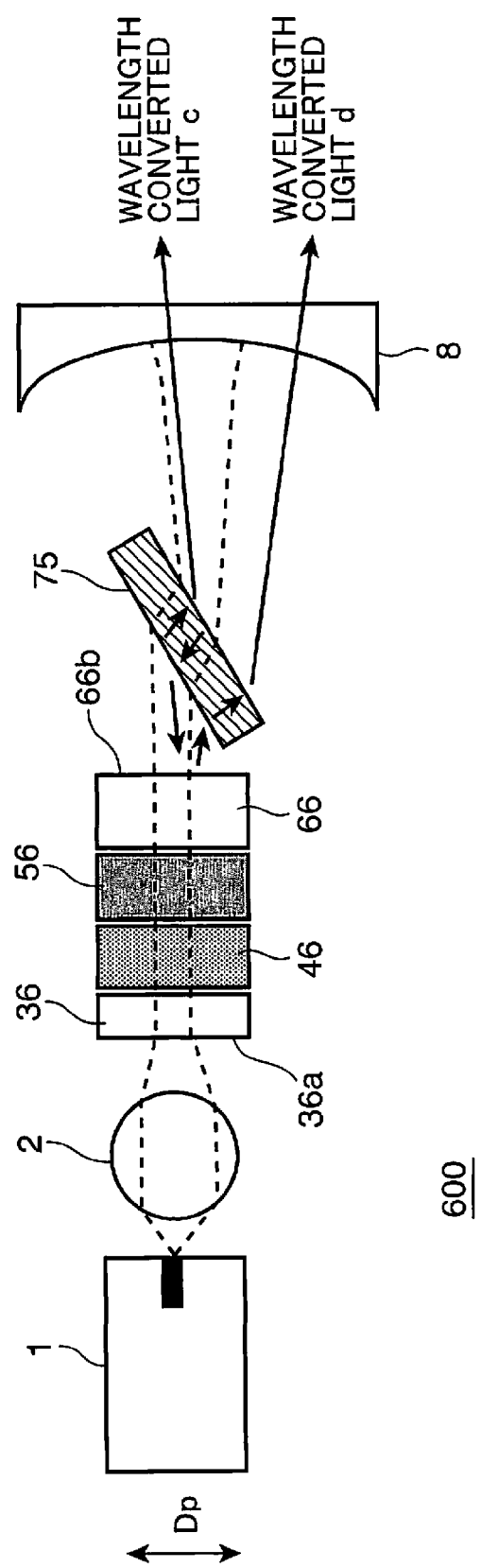
FIG. 8 is an explanatory diagram showing a schematic configuration of the wavelength conversion laser according to the sixth embodiment of the present invention.

The wavelength conversion laser 600 according to the sixth embodiment of the present invention is now explained with reference to FIG. 8. FIG. 8 shows a schematic configuration of the wavelength conversion laser 600. Note that, in FIG. 8, the same reference numeral is given to the same configuration as the foregoing embodiments, and the detailed explanation thereof is omitted.

The wavelength conversion laser 600 differs from the configuration of the fifth embodiment in that it comprises laser media 36, 46, 56 and 66 in substitute for the laser media 35, 45 and 55 of the foregoing fifth embodiment.

With the wavelength conversion laser 600, the excitation light, the solid state laser beam, and the wavelength converted light are oscillated with the linear polarized light in the vertical axis direction of the plane of paper of FIG. 8. The wavelength conversion laser 600 includes four laser media; namely, a laser medium 36 (first laser medium), a laser medium 46 (third laser medium), a laser medium 56 (second laser medium), and a laser medium 66 (first laser medium). The laser medium 36 is a-cut $Nd:YVO_4$ containing 1% of Nd and having a thickness of 0.1 mm. The laser medium 46 is c-cut $Nd:YVO_4$ containing 3% of Nd and having a thickness of 0.2 mm. The laser medium 56 is a-cut $Nd:GdVO_4$ containing 2% of Nd and having a thickness of 0.2 mm. The laser medium 66 is a-cut $Nd:YVO_4$ containing 3% of Nd and having a thickness of 0.2 mm.

The laser medium 36 and the laser medium 66 oscillate the wavelength IR1 (center wavelength of 1064.1 nm) as the first emission wavelength. The laser medium 46 oscillates the wavelength IR3 (center wavelength of 1066.5 nm) as the third emission wavelength. The laser medium 56 oscillates the wavelength IR2 (center wavelength of 1062.8 nm) as the second emission wavelength.

The excitation light that was output from the exciting LD1 enters the laser media 36, 46, 56, 66 in that order. The end face 36a of the laser medium 36 is provided with an AR coat of the excitation light and an HR coat of the solid state laser beam, and the end face 36a allows transmission of the excitation light while reflecting the solid state laser beam. The solid state laser resonator of the wavelength conversion laser 600 is configured from the end face 36a of the laser medium 36 and the concave mirror 8. The wavelength conversion element 75 is disposed at a Brewster's angle relative to the optical axis of the solid state laser resonator, and locks the polarization direction of the solid state laser beam to be oscillated with the c-cut laser medium 46. The wavelength conversion element 75-side end face 66b of the laser medium 66 is provided with an AR coat of the solid state laser beam and an HR coat of the wavelength converted light, and the end face 66b allows transmission of the solid state laser beam while reflecting the wavelength converted light d. The respective end faces between the adjacent laser media 36, 46, 56 and 66 are provided with an AR coat of the excitation light and an AR coat of the solid state laser beam, the excitation light and the solid state laser beam are thereby able to pass through the respective end faces.

The wavelength conversion element 75 has an extremely thin thickness of 0.6 mm for passing the solid state laser beam therethrough, and has an extremely broad phase matching tolerance. The wavelength conversion element 75 simultaneously generates second harmonics SHG1, SHG2, SHG3 of the resonating solid state laser beams IR1, IR2, IR3, and the sum frequencies SFG1 (sum frequency of IR1 and IR2), SFG2 (sum frequency of IR2 and IR3), SFG3 (sum frequency of IR1 and IR3).

A preferred mode of the wavelength conversion laser 600 is to include a laser medium 36 and a laser medium 66 of the emission wavelength IR1, a laser medium 56 of the emission wavelength IR2, and a laser medium 46 of the emission wavelength IR3, the three types of laser media are excited with the excitation light that is output from the same semiconductor laser, the excited laser beam enters the laser medium 36 of the emission wavelength IR1, thereafter enters the laser medium 56 of the emission wavelength IR2 and the laser medium 46 of the emission wavelength IR3, and subsequently enters the laser medium 36 of the emission wavelength IR1.

As described above, by oscillating the solid state laser beams of a plurality of emission wavelengths, it is possible to output wavelength converted light with a plurality of peak wavelengths. The wavelength converted light is able to lower the coherency and reduce interference noise by possessing a plurality of peaks. When the wavelength of the excitation light changes and the absorption coefficient fluctuates, the greatest fluctuation in the absorbed amount of the excitation light will occur in the laser medium to which the excitation light first enters. In this embodiment, the absorbed amount of the excitation light is compensated by causing the excitation light to enter, after passing through another laser medium, a laser medium of the emission wavelength that is the same as the laser medium to which the excitation light first entered. It is thereby possible to stably obtain wavelength converted light with a broad spectrum width.

Note that the types of laser media in the solid state laser are not limited to two types or three types. Specifically, it will suffice so as long as the types of laser media are two types or more, and, for instance, may be four types or more. If this is standardized, the solid state laser may be configured to include n types of laser media including first to nth laser media for oscillating the solid state laser beams of first to nth emission wavelengths (where n is an integer of 2 or more) with respectively different emission wavelengths, wherein the n types of laser media are excited with the excitation light that is output from the common excitation light source. In addition, if the solid state laser is configured to oscillate the solid state laser beams of the first to nth emission wavelengths in the resonator as a result of the excitation light entering a region configured from the first laser medium, thereafter entering a region configured from a laser medium other than the first laser medium, and subsequently entering a region configured from the first laser medium, it is possible to stably obtain wavelength converted light with a broad spectrum width as with the foregoing embodiments.

Seventh Embodiment

Figure 9:
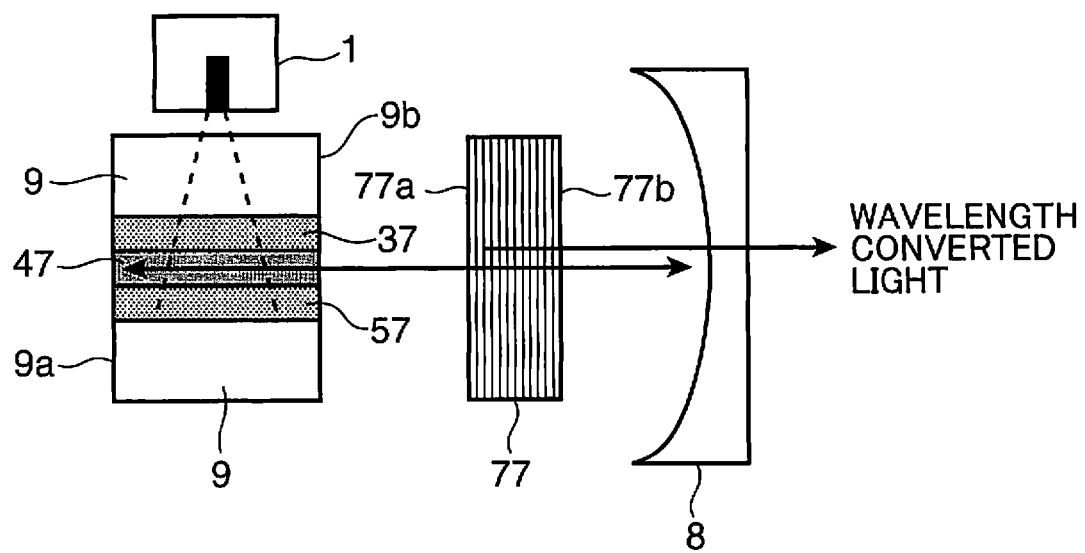
FIG. 9 is an explanatory diagram showing a schematic configuration of the wavelength conversion laser according to the seventh embodiment of the present invention.

The wavelength conversion laser 700 according to the seventh embodiment of the present invention is now explained with reference to FIG. 9. FIG. 9 shows a schematic configuration of the wavelength conversion laser 700. Note that, in FIG. 9, the same reference numeral is given to the same configuration as the foregoing embodiments, and the detailed explanation thereof is omitted.

The wavelength conversion laser 700 has a laminated structure where the three laser media of a laser medium 37 (first laser medium), a laser medium 47 (second laser medium), and a laser medium 57 (first laser medium) are sandwiched between two non-laser media 9. The non-laser medium 9 is configured from $YVO_4$ and does not perform laser oscillate.

The solid state laser resonator of the wavelength conversion laser 700 is formed from a side surface 9a of the laminated structure of the laser medium and a concave mirror 8. In addition, a wavelength conversion element 77 is disposed between the laminated structure and the concave mirror 8.

The wavelength conversion laser 700 is configured so that the excitation light that was output from the exciting LD1 enters from the side surface of the solid state laser resonator. The excitation light that was output from the exciting LD1 passes through the non-laser medium 9, and thereafter enters the laser medium 37, the laser medium 47, and the laser medium 57 in that order. The laser medium 37 is configured from $Nd:YVO_4$ having a Nd concentration of 2% and a thickness of 0.1 mm. The laser medium 47 is configured from $Nd:GdVO_4$ having a Nd concentration of 6% and a thickness of 0.1 mm. The laser medium 57 is configured from $Nd:YVO_4$ having a Nd concentration of 6% and a thickness of 0.1 mm. The non-laser medium 9 is configured from $YVO_4$ having a thickness of 0.3 mm at both the upper and lower parts in FIG. 9. The non-laser medium 9 is configured from the same $YVO_4$ as the adjacently joined laser medium 37 and laser medium 57, and used for causing the refractive index to be the same at their joint interface. The laser medium 37 and the laser medium 57 oscillate the solid state laser beam of the emission wavelength IR1 as the first emission wavelength. The laser medium 47 oscillates the solid state laser beam of the emission wavelength IR2 as the second emission wavelength. The excitation light that was output from the exciting LD1 enters the laser medium 37 of the emission wavelength IR1, thereafter enters the laser medium 47 of the emission wavelength IR2, and subsequently enters the laser medium 57 of the emission wavelength IR1.

Both side surfaces 9a and 9b of the laminated structure configured from the laser medium 37, 47 and 57 and the two non-laser media 9 are mirror polished. The side surface 9a of the laminated structure is provided with an HR coat of the solid state laser beam, and the side surface 9b is provided with an AR coat of the solid state laser beam. The wavelength conversion element 77 is configured from $MgO:LiNbO_3$ (PPLN) having a polarization inversion periodical structure, and has a thickness of 1.5 mm. Moreover, although the polarization inversion period of the wavelength conversion element 77 is 7 um, a phase step of a 0.3 period is formed at the location of 0.3 mm from both ends, and has an extremely broad phase matching tolerance. The wavelength conversion element 77 is able to simultaneously generate a second harmonic SHG1 of the solid state laser beam IR1, a second harmonic SHG2 of the solid state laser beam IR2, and a sum frequency SFG1 of the solid state laser beams IR1 and IR2. The laminated structure-side end face 77a of the wavelength conversion element 77 is provided with an HR coat of the wavelength converted light and an AR coat of the solid state laser beam, and the end face 77a reflects the wavelength converted light while allowing transmission of the solid state laser beam. Moreover, the concave mirror 8-side end face 77b of the wavelength conversion element 77 is provided with an AR coat of the wavelength converted light and the solid state laser beam, and the wavelength converted light and the solid state laser beam are thereby able to pass through the end face 77b.

The wavelength conversion laser 700 is a so-called side surface excitation-type laser, and, as described above, the excitation light enters from the side surface direction of the solid state laser resonator. However, as a result of causing the excitation light to enter the laser media in the order described above, the same operation and effect as the configuration of the first embodiment can be yielded, and it is possible to stably obtain low-coherent wavelength converted light.

Eighth Embodiment

Figure 10:
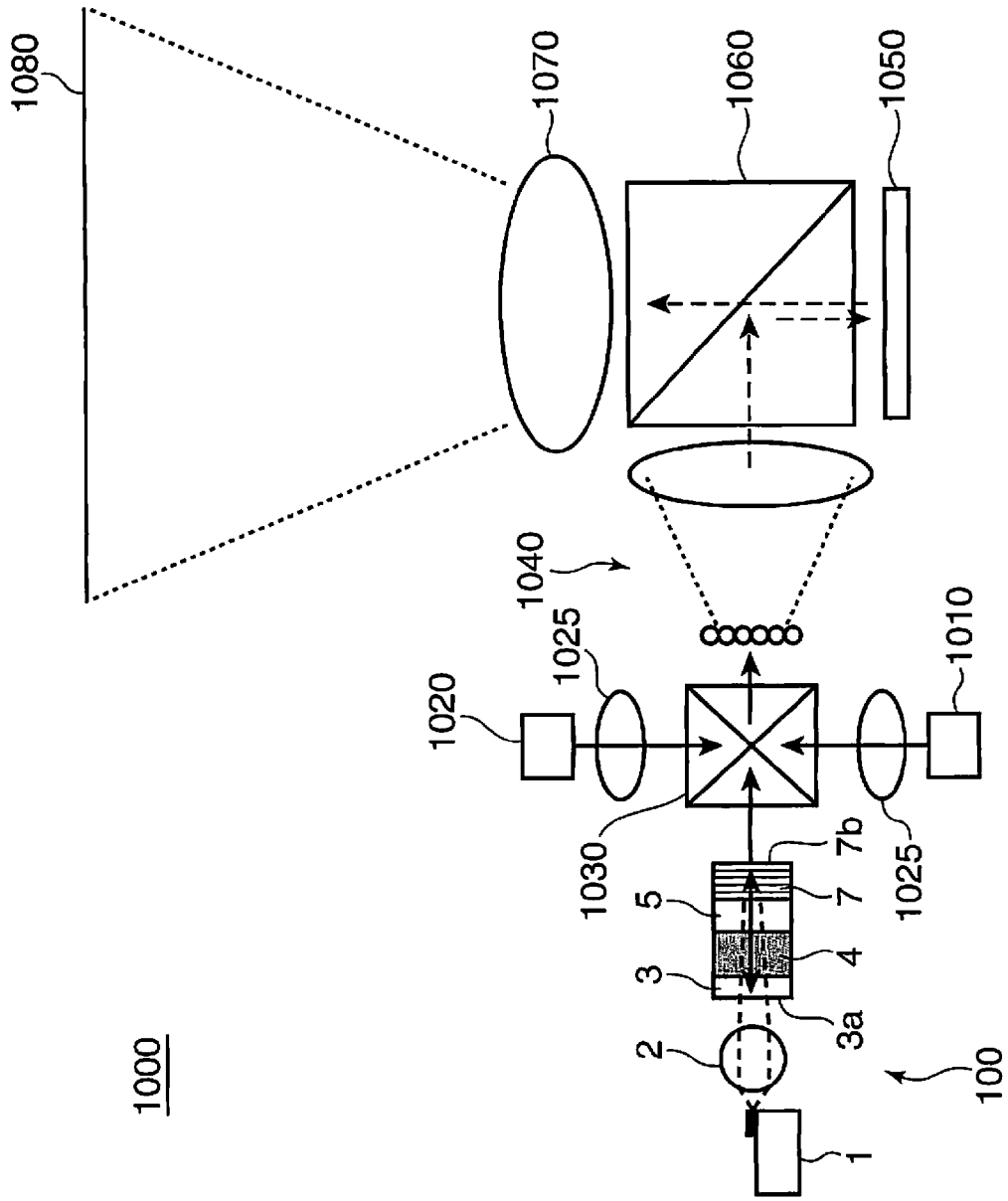
FIG. 10 is an explanatory diagram showing a schematic configuration of the image display device according to the eighth embodiment of the present invention.

The image display device 1000 according to the eighth embodiment of the present invention is now explained with reference to FIG. 10 to FIG. 14. FIG. 10 shows a schematic configuration of the image display device 1000. Note that, in FIG. 10, the same reference numeral is given to the same configuration as the foregoing first to seventh embodiments, and the detailed explanation thereof is omitted.

The image display device 1000 is a laser projector including a wavelength conversion laser 100 for outputting a green laser beam, a red LD 1010 for outputting a red laser beam, and a blue LD 1020 for outputting a blue laser beam.

Light that is output from the red LD 1010 and the blue LD 1020 is collimated with a collimator 1025, and multiplexed with light that is output from the wavelength conversion laser 100 with a multiplexing prism 1030. The multiplexed light is reshaped into rectangular light with uniform intensity with the illumination optical system 1040. The illumination optical system 1040 is configured from a cross lenticular lens and a condenser lens. The reshaped beam illuminates the spatial light modulator 1050 via a PBS 1060 as a polarization beam splitter. The spatial light modulator 1050 is configured from a reflective LCOS (Liquid Crystal On Silicon), and expresses gradation by rotating the polarized light. The modulated light that was reflected off the spatial light modulator 1050 and which passed through the PBS 1060 is enlarged and projected on a display surface 1080 with the projection lens 1070.

The spectral distribution is broadened in the red LD 1010 and the blue LD 1020 by using a multi mode LD. The wavelength conversion laser 100 that was explained in detail in the first embodiment is broadening the spectral distribution by simultaneously outputting the respective second harmonics and the sum frequency of the solid state laser beams IR1 and IR2 having different wavelengths.

A preferred mode of the image display device 1000 is to include a low-coherent wavelength conversion laser 100 for stably outputting a second harmonic and a sum frequency from a solid state laser beam of a plurality of different wavelengths even upon a temperature change, and an element 1050 for modulating the output wavelength converted light. As a result of using the low-coherent wavelength converted light with a broadened spectral distribution, it is possible to reduce speckle noise to become image noise and constantly display high quality images. In particular, since temperature management is difficult with a mobile projector that is used by being carried around, this configuration of being able to constantly reduce the speckle noise to become image noise even if there is a temperature change is suitable. The wavelength conversion laser of this invention is particularly suitable for use in a green laser with high visibility. Since green has high visibility, the speckle noise is easily recognized by the viewers. As a result of using the wavelength conversion laser of the present invention for generating a green laser beam, the speckle noise will no longer be recognized by the viewers.

The spatial light modulator 1050 modulates the laser beams of red, green and blue in a time division. Specifically, the laser beams of red, blue and green are sequentially output from the laser beam source of the respective colors. Accordingly, the green wavelength conversion laser 100 will also repeat the output and stoppage of the wavelength converted light.

Figure 11A:
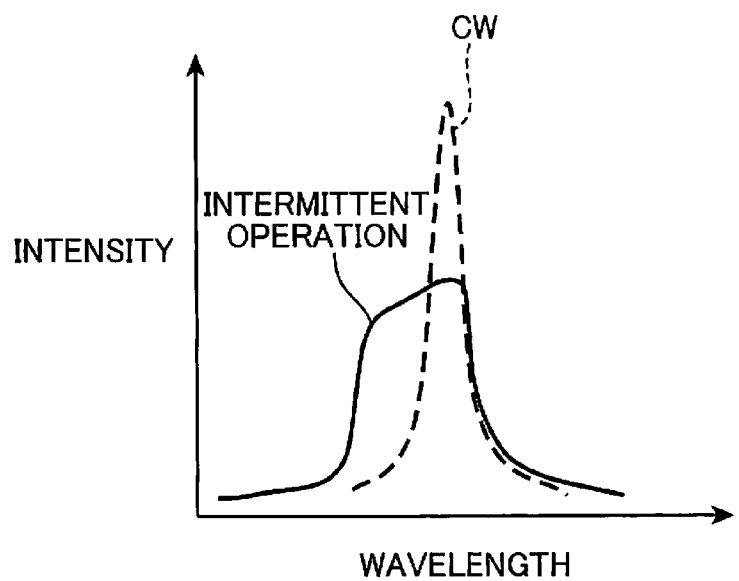
FIG. 11A is a graph showing the excitation light wavelength distribution according to the eighth embodiment of the present invention.
Figure 11B:
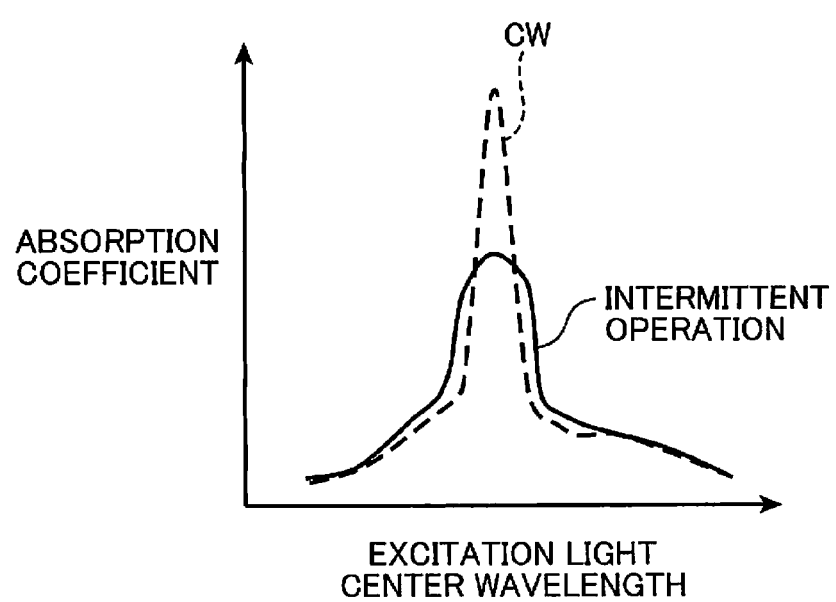
FIG. 11B is a graph showing the excitation light wavelength dependency of the absorption coefficient according to the eighth embodiment of the present invention.

A preferred mode of the image display device 1000 includes laser beam sources for oscillating the wavelengths of red, blue and green, and used the wavelength conversion laser for outputting the wavelength converted light of a broad spectrum width as at least the green laser beam source to broaden a spectrum width of the excitation light that is output from the semiconductor laser and reduces a spectrum change caused by a temperature change of the wavelength converted light based on an intermittent operation of the excitation light source of repeating output and stoppage of the excitation light upon sequentially outputting the laser beam sources of the three colors for each color. The exciting LD1 of the wavelength conversion laser 100, based on the intermittent operation of repeating the output and stoppage of the excitation light, repeats heat generation and cooling of the LD chip and causes a temperature change in the LD chip within the time frame that the excitation light is being output. Since the wavelength of the excitation light will change due to the temperature change of the LD chip, the spectrum width of the excitation light that is output from the exciting LD1 will broaden due to the foregoing intermittent operation. FIG. 11A shows a state where the spectrum width of the excitation light is broadening as a result of the excitation light wavelength being switched from the CW (continuous wave) operation to the intermittent operation. FIG. 11B shows a state where the adsorption coefficient changes in the laser medium when the center wavelength of the excitation light changes. As a result of subjecting the exciting LD1 to intermittent operation, the spectrum width of the excitation light will broaden and the amount of change in the absorption coefficient caused by the excitation light center wavelength will decrease. Moreover, with the intermittent operation, even if the excitation light center wavelength changes due to the temperature, the change in the absorption coefficient will decrease. In this embodiment, since the absorption of the excitation light is distributed to a plurality of laser media of different emission wavelengths, change in the absorption coefficient is preferably small. As a result of causing the change in the absorption coefficient to be small, it is possible to reduce the spectrum change caused by the temperature of the wavelength converted light that is output from the wavelength conversion laser 100. It is thereby possible to cause the image display device 1000 to constantly be in a state that is free from speckle noise.

FIG. 12 to FIG. 14 show the schematic waveform of the injected current to the exciting LD1 in the wavelength conversion laser 100 and the wavelength distribution of the excitation light. With the wavelength conversion laser 100, as shown in of FIG. 12A, the injected current to the exciting LD1 is modulated and the intermittent operation is performed. The stepwise intermittent operation of FIG. 13 and the sawtooth waveform intermittent operation of FIG. 14 are preferred modulation operations of the wavelength conversion laser 100. The configuration for realizing the intermittent operation of FIG. 13 and FIG. 14 is as follows; namely, in a wavelength conversion laser including a wavelength conversion element in a solid state laser resonator, a solid state laser includes at least a laser medium of the emission wavelength IR1 and a laser medium of the emission wavelength IR2, the two types of laser media are excited with the excitation light that is output from the same semiconductor laser (exciting LD1), the solid state laser beams of the emission wavelength IR1 and the emission wavelength IR2 are oscillated in the solid state laser resonator, the wavelength conversion element 7 in the resonator simultaneously generates second harmonics SHG1, SHG2 and a sum frequency SFG1 of the emission wavelength IR1 and the emission wavelength IR2, and the semiconductor laser is caused to operate intermittently so that the early injected current of the semiconductor laser in operation (outputting excitation light) to be smaller than the late injected current. Note that the early injected current refers to an average injected current of a first half part of the semiconductor laser (exciting LD1) in operation, and the late injected current refers to an average injected current of a latter half part of the semiconductor laser in operation. In the example shown in FIG. 13, the early injected current is made to be smaller than the late injected current as a result of modulating the injected current value in a stepwise manner. Moreover, in the example shown in FIG. 14, the early injected current is made to be smaller than the late injected current as a result of modulating the injected current in a sawtooth waveform upon increasing it to a threshold current. The center wavelength of the excitation light that is output from the exciting LD1 tends to monotonically increase relative to the injected current in addition to the temperature. Thus, to cause the early injected current to be smaller than the late injected current will yield the effect of lowering the temperature of the first half part of the injected current and the injected current value, and broadening the short wavelength-side components of the spectral distribution of the excitation light that is output from the exciting LD1. Moreover, with the late injected current, the injected current can be set high relative to the rectangular operation of FIG. 12 upon obtaining the same total output as the rectangular operation of FIG. 12. Here, at the late injected current part, the spectral distribution of the excitation light will also be broadened to the long wavelength side. By setting the early injected current to be smaller than the late injected current in the operation, the wavelength distribution of the excitation light will broaden considerably, and changes in the absorption coefficient of the excitation light center wavelength of the respective laser media will become extremely gradual. In this embodiment, the absorption of the excitation light is distributed to laser media with different emission wavelengths, but the change in the bias of the absorbed amount of the laser media can be suppressed by reducing the change in the absorption coefficient relative to the change in the excitation light center wavelength. It is thereby possible to stably obtain low-coherent wavelength conversion output light even if there is a temperature change or the like.

Note that, as the spatial light modulator of the wavelength converted light of the image display device, in addition to the foregoing reflective LCOS, a spatial light modulator based on transmissive liquid crystal or DMD may also be used. In addition, with a transmissive liquid crystal, the liquid crystal surface may be used as the display surface without using a projection lens. Moreover, the modulation device is not limited to a spatial light modulator, and may also be a mode of combining the intensity modulation of the wavelength converted light and the scanning optical system.

Although this embodiment used a lenticular lens as the illumination optical system, the present invention is not limited thereto, and a rod integrator or a fry eye lens may also be used.

Moreover, although this embodiment illustrated a case of applying the wavelength conversion laser 100 that was explained in detail in the first embodiment, the present invention is not limited thereto, and the wavelength conversion laser 200, 300, 400, 500, 600 or 700 described in detail in the second to seventh embodiments may also be used.

Note that the present invention is not limited to the foregoing first to eighth embodiments, and may be configured by combining the respective first to eighth embodiments. The host material of the laser medium is not limited to vanadate crystals, and may also be garnet crystals of YAG or the like, polycrystals such as ceramics, glass or the like. The active ion material is also not limited to Nd, and it may be other materials such as Yb capable of laser oscillation. In addition, the configuration may add optical parts such as a mirror or lens as needed.

Although the foregoing first to eighth embodiments used LN or LT having a polarization inversion periodical structure as the wavelength conversion element, other nonlinear optical crystals may also be used. Moreover, the polarization inverted structure may be configured to change the period by design.

In addition, although the foregoing first to eighth embodiments showed a configuration of outputting green wavelength converted light, there is no limitation to the wavelength to be output, and the configuration may be such that the lasers of the respective colors of blue, yellow, red and the like are output.

The following is a summary of the present invention based on each of the foregoing embodiments. Specifically, the wavelength conversion laser according to the present invention has an excitation light source for outputting excitation light, a solid state laser including a resonator, and a wavelength conversion element disposed in the resonator, wherein the solid state laser includes a first laser medium and a second laser medium as at least two types of laser media, the first laser medium oscillates a solid state laser beam of a first emission wavelength and the second laser medium oscillates a solid state laser beam of a second emission wavelength, wherein said at least two types of laser media are excited by the excitation light that is output from the common excitation light source, wherein the solid state laser is configured to oscillate the solid state laser beams of the first emission wavelength and the second emission wavelength in the resonator as a result of the excitation light entering a region configured from the first laser medium, thereafter entering a region configured from the second laser medium, and subsequently entering a region configured from the first laser medium, and wherein the wavelength conversion element in the resonator converts the solid state laser beams of the first emission wavelength and the second emission wavelength into a second harmonic and a sum frequency of the first emission wavelength and the second emission wavelength, and simultaneously generates the second harmonic and the sum frequency.

According to the foregoing configuration, the solid state laser includes at least two types of laser media, and the two types of laser media are excited with excitation light that is output from a common excitation light source. Here, as a result of the excitation light (1) entering a region configured from the first laser medium, (2) thereafter entering a region configured from the second laser medium, and (3) subsequently entering a region configured from the first laser medium, it is possible to oscillate, in a well balanced manner, the solid state laser beams of the first emission wavelength and the second emission wavelength in the solid state laser resonator. Specifically, after foregoing (1) and (2), by causing the excitation light to enter a region configured from the first laser medium as with foregoing (3), compensation is performed so that the ratio of the excitation light absorbed amount (excitation light absorption ratio) of the two types of laser media is maintained constant. For example, if the wavelength of the excitation light deviates from the optimal value due to an environmental temperature change or the like, the absorption coefficient of the excitation light in the first laser medium in foregoing (1) will deteriorate, and the absorption ratio of the excitation light will deteriorate. Consequently, since the amount of excitation light that enters the second laser medium in foregoing (2) will increase and the absorption coefficient of the second laser medium will simultaneously deteriorate, even if the wavelength of the excitation light changes in the second laser medium in foregoing (2), the absorption ratio will be maintained without any significant change. In addition, since the amount of excitation light that enters the first laser medium in foregoing (3) will increase pursuant to the deterioration in the absorption coefficient of the excitation light in the first laser medium and the second laser medium in foregoing (1) and (2), the absorption ratio of the excitation light in the first laser medium in foregoing (3) will increase. Thus, the ratio of the total absorption ratio of the first laser medium in foregoing (1) and (3) and the absorption ratio of the second laser medium in foregoing (2) is maintained approximately constant regardless of the amount of change in the wavelength of the excitation light. It is thereby possible to maintain the intensity ratio of the solid state laser beams of the first emission wavelength and the second emission wavelength to be constant even if the wavelength of the excitation light changes. Thus, even if a wavelength conversion element that simultaneously generates the second harmonic and the sum frequency of the first emission wavelength and the second emission wavelength is used, a broad spectrum width can be maintained without causing significant bias in the foregoing three wavelengths in the spectral distribution of the wavelength converted light. As described above, according to the foregoing configuration, it is possible to realize a wavelength conversion laser capable of stably outputting a low-coherent wavelength conversion laser beam with a broad spectrum width even if the wavelength of the excitation light changes due to the occurrence of a temperature change or the like.

Preferably, the solid state laser is configured such that the region configured from the second laser medium is disposed between the two regions configured from the first laser medium, and, of the two regions configured from the first laser medium, the active ion concentration of the region to which the excitation light output from the excitation light source enters subsequently is higher than the active ion concentration of the region to which the excitation light enters previously.

According to the foregoing configuration, the region configured from the second laser medium is disposed between the two regions configured from the first laser medium. Thus, the heat generation points based on the absorption of excitation light can be distributed to a plurality of regions. In addition, of the two regions configured from the first laser mediaince the active ion concentration of the region (region with smaller excitation light power) to which the excitation light output from the excitation light source enters subsequently is higher than the active ion concentration of the region (region with greater excitation light power) to which the excitation light enters previously, the rise in temperature of the laser medium caused by the absorption of excitation light can be kept low on the whole. Consequently, since it is possible to efficiently prevent the deterioration in the wavelength conversion efficiency caused by the heat generation of the laser medium, a highly efficient, high output wavelength conversion laser can be realized.

Preferably, the first laser medium is Nd:YVO$_4$ and the second laser medium is Nd:GdVO$_4$, and the first laser medium and the second laser medium are joined together.

Here, since YVO$_4$ and GdVO$_4$ are of the same crystal system, the refractive index and the coefficient of thermal expansion are approximately equal. Thus, by joining the first laser medium and the second laser medium configured from the foregoing crystal systems, they can be treated as a single crystal. As a result of directly joining the crystals of two types of laser media as described above, the joint strength between the crystals is yielded and processing such as cutting can also be performed easily. Moreover, since the laser medium length can be shortened based on the joint, this is useful in maintaining the collected state of the excitation light. In addition, Nd:YVO$_4$ with a longer emission wavelength than the second laser medium is used as the first laser medium to which the excitation light first enters. As a result of the excitation light first entering a laser medium with a longer emission wavelength, the temperature of the laser medium with a longer emission wavelength can be increased further. With the laser medium with an increased temperature, since the emission wavelength will shift to the long wavelength side, the difference in the emission wavelength will increase due to the temperature increase, and the spectrum width of the wavelength converted light to be output can be further broadened.

Preferably, a reflectance coat of the excitation light is formed on an end face on the wavelength conversion element side of the region configured from the first laser medium or the second laser medium that is disposed farthest from the excitation light source, the solid state laser resonator additionally includes an interface for reflecting wavelength converted light generated by the wavelength conversion element without causing the same to enter a laser medium, and the wavelength conversion element has a polarization inversion periodical structure that is inclined relative to an optical axis of the solid state laser resonator, and separates and outputs the wavelength converted light as two beams.

According to the foregoing configuration, since a high reflectance coat of the excitation light is formed on an end face on the wavelength conversion element side of the region configured from the first laser medium or the second laser medium that is disposed farthest from the excitation light source, the excitation light that is reflected off the high reflectance coat can be caused to efficiently enter the laser medium disposed on the excitation light source side once again, and the number of laser media to be laminated can be reduced.

Moreover, since an interface for reflecting wavelength converted light generated with the wavelength conversion element without causing it to enter a laser medium is additionally provided, it is possible to prevent the wavelength converted light from being absorbed by the laser medium, and inhibit the deterioration in output of the wavelength converted light and the heat generation of the laser medium. It is thereby possible to output the wavelength converted light with high efficiency.

In addition, since the wavelength conversion element has a polarization inversion periodical structure that is inclined relative to an optical axis of the solid state laser resonator, and separates and outputs the wavelength converted light as two beams, it is able to separate and output the wavelength converted light as two beams (outgoing beam that is output without being reflected off the interface and incoming beam that is output upon being reflected off the interface). Accordingly, by separating and outputting the wavelength converted light as two beams, it is possible to avoid the interference between the two beams, and generate a stable wavelength converted light that is free from output fluctuation.

Preferably, the solid state laser is configured such that the optical axis directions of the region configured from the first laser medium and the region configured from the second laser medium are disposed in different directions, and the solid state laser beams of the first emission wavelength and the second emission wavelength oscillate in the resonator as linear polarized light of the same direction.

According to the foregoing configuration, by disposing the same laser medium material such that the optical axis directions will be different directions, the emission wavelengths of the first laser medium and the second laser medium can be made different. Since the same laser medium material can be used in the region configured from the first laser medium and the region configured from the second laser medium, it is possible to seek cost reduction.

Preferably, the first laser medium and the second laser medium are tetragonal laser crystals, the emission wavelengths of the first laser medium and the second laser medium are made to be different by disposing c axes of the first laser medium and the second laser medium to be different in two types of directions of a perpendicular direction and a parallel direction relative to an optical axis of the resonator, and the solid state laser beams of the first emission wavelength and the second emission wavelength are oscillated in the resonator as linear polarized light of the same direction by disposing the wavelength conversion element at a Brewster's angle relative to an optical axis of the solid state laser resonator.

According to the foregoing configuration, the solid state laser beams of the first emission wavelength and the second emission wavelength are oscillated in the resonator as linear polarized light of the same direction by using the Brewster's angle while realizing the oscillation of different wavelengths by using the anisotropy of the crystals of the first laser medium and the second laser medium. It is thereby possible to simultaneously realize the wavelength conversion of a plurality of wavelengths, and obtain wavelength converted light with a broad spectrum width. This kind of wavelength converted light with a broad spectrum width is free from interference noise can be suitably used broadly in the fields of visual media and lighting.

Preferably, the solid state laser includes at least three types of laser media further including a third laser medium for oscillating a solid state laser beam of a third emission wavelength, said at least three types of laser media are excited by the excitation light that is output from the common excitation light source, and the solid state laser is configured so that the excitation light enters a region configured from the first laser medium, thereafter enters a region configured from at least the second laser medium and a region configured from the third laser medium, and subsequently enters a region configured from the first laser medium.

According to the foregoing configuration, by oscillating the solid state laser beams of at least three types of emission wavelengths, wavelength converted light with a plurality of peak wavelengths can be output. Here, the wavelength converted light is able to lower the coherency and reduce interference noise by possessing a plurality of peaks in a well balanced manner, but, in order to achieve this, it is necessary to maintain the absorbed amount (or absorption ratio) of the excitation light of different types of laser media to be constant as described above. For example, if the wavelength of the excitation light changes due to an environmental temperature change or the like and there is fluctuation in the absorption coefficient of the respective laser media, the greatest fluctuation in the absorbed amount of the excitation light will occur in the laser medium (first laser medium) to which the excitation light first enters. Thus, the fluctuation in the absorbed amount of the excitation light is compensated by causing the excitation light to enter, after passing through a laser medium (second laser medium or third laser medium) other than the first laser medium, a laser medium (first laser medium) of the emission wavelength that is the same as the laser medium to which the excitation light first entered. Consequently, it is possible to realize a wavelength conversion laser capable of stably outputting a low-coherent wavelength conversion laser beam with a broad spectrum width even if the wavelength of the excitation light changes due to the occurrence of a temperature change or the like.

Preferably, the solid state laser includes n types of laser media including first to nth laser media for oscillating the solid state laser beams of first to nth emission wavelengths (where n is an integer of 2 or more) by respectively different emission wavelengths, the n types of laser media are excited by the excitation light that is output from the common excitation light source, the solid state laser is configured to oscillate the solid state laser beams of the first to nth emission wavelengths in the resonator as a result of the excitation light entering a region configured from the first laser medium, thereafter entering a region configured from a laser medium other than the first laser medium, and subsequently entering a region configured from the first laser medium, and the wavelength conversion element in the resonator converts the solid state laser beams of the first to nth emission wavelengths into a second harmonic and a sum frequency of the first to nth emission wavelengths, and simultaneously generates the second harmonic and the sum frequency.

According to the foregoing configuration, by oscillating the solid state laser beams of n types of emission wavelengths, it is possible to output wavelength converted light with a plurality of peak wavelengths according to the number of such types. In the foregoing case also, the fluctuation in the absorbed amount of the excitation light can be compensated by causing the excitation light to foremost enter a region configured from the first laser medium, pass through a laser medium other than the first laser medium, and thereafter enter a laser medium (first laser medium) of an emission wavelength that is the same as the laser medium to which the excitation light first entered. Consequently, it is possible to realize a wavelength conversion laser capable of stably outputting a low-coherent wavelength conversion laser beam with a broad spectrum width even if the wavelength of the excitation light changes due to the occurrence of a temperature change or the like.

Preferably, a peak of an absorption ratio of the excitation light of the first laser medium in a region to which the excitation light output from the excitation light source first enters is 10% or higher and 75% or less.

According to the foregoing configuration, the ratio of the absorbed amount between the first laser medium and the second laser medium can be suppressed to be within a favorable range of 0.5 to 2, and low-coherent wavelength converted light without any bias in the spectral distribution can be obtained.

Preferably, the solid state laser is configured so that the excitation light alternately enters a region configured from the first laser medium and a region configured from the second laser medium two or more times.

According to the foregoing configuration, even if the wavelength of the excitation light changes due to a temperature change and the absorption coefficients of the first laser medium and the second laser mediaignificantly change, the absorption ratio of the excitation light of the two types of laser media can be kept constant. It is thereby possible to output wavelength converted light with a broad spectrum width in an extremely broad temperature range.

The image display device according to the present invention comprises any one of the wavelength conversion lasers described above, and an element for modulating wavelength converted light output from the wavelength conversion laser.

Since this image display device is able to stably use low-coherent wavelength converted light with a broadened spectral distribution even in the occurrence of a temperature change or the like, it is possible to reduce the speckle noise which leads to image noise, and stably display high quality images.

Preferably, the foregoing image display device comprises a red laser beam source for oscillating a red wavelength, a green laser beam source for oscillating a green wavelength, and a blue laser beam source for oscillating a blue wavelength, wherein the green laser beam source includes the wavelength conversion laser, wherein the red laser beam source, the green laser beam source and the blue laser beam source sequentially output a laser beam for each color, and wherein the wavelength conversion laser broadens a spectrum width of the excitation light and reduces a spectrum change caused by a temperature change of the wavelength converted light, based on an intermittent operation of the excitation light source of repeating output and stoppage of the excitation light.

According to the foregoing configuration, since a wavelength conversion laser capable of stably generating low-coherent wavelength converted light with a broadened spectral distribution even in the occurrence of a temperature change or the like is used as the green laser beam source, green speckle noise that is easily recognized can be eliminated. Moreover, since the laser beams of red, blue and green are sequentially output in time division from the laser beam sources of the respective colors, the wavelength conversion laser to oscillate the green wavelength will also repeat the output and stoppage of the wavelength converted light. Since this wavelength conversion laser performs the intermittent operation of repeating the output and stoppage of the excitation light, the excitation light source repeats heat generation and cooling, and causes a temperature change in the excitation light source within the time frame that the excitation light is being output. Consequently, the wavelength of the excitation light that is output from the excitation light source will change, and the spectrum width thereof will broaden. If the spectrum width of the excitation light is broadened due to the intermittent operation of the excitation light source described above, the amount of change in the absorption coefficient of the respective laser media caused by the excitation light center wavelength will decrease. Since the wavelength conversion laser distributes the absorption of the excitation light to a plurality of laser media with different emission wavelengths, the spectrum change caused by the temperature change of the wavelength converted light to be output can be reduced by reducing the amount of change in the absorption coefficient of the respective laser media. It is thereby possible to realize a high quality image display device that is free from speckle noise.

Preferably, with the foregoing image display device, the wavelength conversion laser causes an early injected current as an average injected current of a first half part of an injected current to be injected into the excitation light source while the excitation light source is in operation to be smaller than a late injected current as an average injected current of a latter half part of the injected current.

Here, the center wavelength of the excitation light that is output from the excitation light source tends to monotonically increase relative to the injected current. Thus, to cause the early injected current to be smaller than the late injected current as in the foregoing configuration will yield the effect of lowering the temperature of the first half part of the injected current and the injected current value, and broadening the short wavelength-side components of the spectral distribution of the excitation light that is output from the excitation light source. For the amount that the early injected current is set to be smaller, the late injected current can be set to be greater, and the spectral distribution of the excitation light can thereby also be broadened to the long wavelength side. Accordingly, by setting the early injected current to be smaller than the late injected current in the operation, the wavelength distribution of the excitation light will broaden considerably, and changes in the absorption coefficient of the excitation light center wavelength of the respective laser media will become extremely gradual. Since the wavelength conversion laser distributes the absorption of the excitation light to a plurality of laser media with different emission wavelengths, the spectrum change caused by the temperature change of the wavelength converted light to be output can be reduced by reducing the amount of change in the absorption coefficient of the respective laser media. It is thereby possible to realize a high quality image display device that is free from speckle noise.

INDUSTRIAL APPLICABILITY

The wavelength conversion laser of the present invention can be applied to various wavelength conversion lasers demanded of low-coherent, and is particularly suitable for a low-coherent and highly efficient compact laser in the fields of visual media and lighting.

The invention claimed is:
1. A wavelength conversion laser, comprising:
an excitation light source for outputting excitation light;
a solid state laser including a resonator; and
a wavelength conversion element disposed in the resonator,
wherein the solid state laser includes a first laser medium and a second laser medium as at least two types of laser media, the first laser medium oscillates a solid state laser beam of a first emission wavelength and the second laser medium oscillates a solid state laser beam of a second emission wavelength,
wherein said at least two types of laser media are excited by the excitation light that is output from the common excitation light source,
wherein the solid state laser includes two regions configured from the first laser medium, and the second laser medium is disposed between the two regions,
wherein the excitation light enters one of the two regions configured from the first laser medium, then enters the second laser medium, and then enters the other of the two regions to be converted into the solid state laser beams of the first and second emission wavelengths in the resonator, and
wherein the wavelength conversion element in the resonator converts the solid state laser beams of the first emission wavelength and the second emission wavelength into a second harmonic and a sum frequency of the first emission wavelength and the second emission wavelength, and simultaneously generates the second harmonic and the sum frequency.
2. The wavelength conversion laser according to claim 1, wherein the other of the two regions has a higher active ion concentration than the one of the two regions.

3. The wavelength conversion laser according to claim 1, wherein
the first laser medium is Nd:YVO$_4$ and the second laser medium is Nd:GdVO$_4$, and
the first laser medium and the second laser medium are joined together.

4. The wavelength conversion laser according to claim 1, wherein a reflectance coat of the excitation light is formed on an end face on the wavelength conversion element side of the other of the two regions,
wherein the solid state laser resonator additionally includes an interface for reflecting wavelength converted light generated with the wavelength conversion element without causing the wavelength converted light to enter a laser medium, and
wherein the wavelength conversion element has a polarization inversion periodical structure that is inclined relative to an optical axis of the solid state laser resonator, and separates and outputs the wavelength converted light as two beams.

5. The wavelength conversion laser according to claim 1, wherein
the solid state laser is configured such that optical axis directions of the region configured from the first laser medium and the region configured from the second laser medium are disposed in different directions, and
the solid state laser beams of the first emission wavelength and the second emission wavelength oscillate in the resonator as linear polarized light of the same direction.

6. The wavelength conversion laser according to claim 5, wherein the first laser medium and the second laser medium are tetragonal laser crystals,
wherein the emission wavelengths of the first laser medium and the second laser medium are made to be different by disposing c axes of the first laser medium and the second laser medium to be different in two types of directions of a perpendicular direction and a parallel direction relative to an optical axis of the resonator, and
wherein the solid state laser beams of the first emission wavelength and the second emission wavelength are oscillated in the resonator as linear polarized light of the same direction by disposing the wavelength conversion element at a Brewster's angle relative to an optical axis of the solid state laser resonator.

7. The wavelength conversion laser according to claim 1, wherein the solid state laser includes at least three types of laser media further including a third laser medium for oscillating a solid state laser beam of a third emission wavelength,
wherein said at least three types of laser media are excited by the excitation light that is output from the common excitation light source, and
wherein the solid state laser is configured so that the excitation light enters a region configured from the first laser medium, thereafter enters a region configured from at least the second laser medium and a region configured from the third laser medium, and subsequently enters a region configured from the first laser medium.

8. The wavelength conversion laser according to claim 1, wherein the solid state laser includes n types of laser media including first to nth laser media for oscillating solid state laser beams of first to nth emission wavelengths having respectively different emission wavelengths, and n is an integer of 2 or more,
wherein the n types of laser media are excited by the excitation light that is output from the common excitation light source, and
wherein the wavelength conversion element in the resonator converts the solid state laser beams of the first to nth emission wavelengths into a second harmonic and a sum frequency of the first to nth emission wavelengths, and simultaneously generates the second harmonic and the sum frequency.

9. The wavelength conversion laser according to claim 1, wherein a peak of an absorption ratio of the excitation light of the first laser medium in a region to which the excitation light output from the excitation light source first enters is 10% or higher and 75% or less.

10. The wavelength conversion laser according to claim 1, wherein the solid state laser is configured so that the excitation light alternately enters a region configured from the first laser medium and a region configured from the second laser medium two or more times.

11. An image display device, comprising:
the wavelength conversion laser according to claim 1; and
an element for modulating wavelength converted light output from the wavelength conversion laser.

12. The image display device according to claim 11, comprising:
a red laser beam source for oscillating a red wavelength;
a green laser beam source for oscillating a green wavelength; and
a blue laser beam source for oscillating a blue wavelength,
wherein the green laser beam source includes the wavelength conversion laser,
wherein the red laser beam source, the green laser beam source and the blue laser beam source sequentially output a laser beam for each color, and
wherein the wavelength conversion laser broadens a spectrum width of the excitation light and reduces a spectrum change caused by a temperature change of the wavelength converted light, based on an intermittent operation of the excitation light source of repeating output and stoppage of the excitation light.

13. The image display device according to claim 12, wherein the wavelength conversion laser causes an early injected current as an average injected current of a first half part of an injected current to be injected into the excitation light source while the excitation light source is in operation to be smaller than a late injected current as an average injected current of a latter half part of the injected current.

14. The wavelength conversion laser according to claim 1, wherein
the other of the two regions is situated between the second laser medium and the wavelength conversion element,
the wavelength conversion element is directly jointed to the other of the two regions.

* * * * *